United States Patent
Kumano

(10) Patent No.: US 6,621,406 B2
(45) Date of Patent: Sep. 16, 2003

(54) KEYLESS ENTRY SYSTEM FOR VEHICLE

(75) Inventor: Masakazu Kumano, Aki-gun (JP)

(73) Assignee: U-Shin Ltd., Tokyo (JP)

(*) Notice: Subject to any disclaimer, the term of this patent is extended or adjusted under 35 U.S.C. 154(b) by 0 days.

(21) Appl. No.: 10/120,760

(22) Filed: Apr. 11, 2002

(65) Prior Publication Data

US 2002/0153995 A1 Oct. 24, 2002

(30) Foreign Application Priority Data

Apr. 18, 2001 (JP) .......................................... 2001-120270
Apr. 18, 2001 (JP) .......................................... 2001-120275
Apr. 18, 2001 (JP) .......................................... 2001-120281

(51) Int. Cl.[7] .............................................. G05B 19/00
(52) U.S. Cl. ...................... 340/5.62; 340/5.72; 340/5.61; 340/5.1; 340/5.2; 340/5.64; 340/5.8; 340/539; 340/825.69; 307/10.1; 307/10.7; 74/557; 74/560; 74/568 R; 74/525; 74/539; 74/543
(58) Field of Search ................................ 340/5.62, 5.72, 340/5.61, 5.1, 5.2, 5.64, 5.8, 539, 10.33, 10.34, 825.69; 307/10.1, 10.7; 74/557, 560, 568 R, 512, 513, 525, 539, 543; 701/2

(56) References Cited

U.S. PATENT DOCUMENTS 5,416,471 A * 5/1995 Treharne et al. ............ 340/5.24
5,517,189 A * 5/1996 Bachhuber et al. ......... 340/5.64
5,602,535 A * 2/1997 Boyles et al. ............... 340/5.22
6,101,428 A * 8/2000 Snyder ........................... 701/2

* cited by examiner

Primary Examiner—Brian Zimmerman
Assistant Examiner—Yves Dalencourt
(74) Attorney, Agent, or Firm—Koda & Androlia

(57) ABSTRACT

A keyless entry system for a vehicle is provided, on the vehicle, with detection distance setting circuit for changing a detection distance within which an electronic key can receive an activation signal. By carrying out predetermined operations, the keyless entry systems enters an adjustment mode wherein the detection distance can be changed by the detection distance setting circuit. With this configuration, the detection distance can be adjusted while the keyless entry system is mounted on the vehicle, whereby it is possible to attain a system causing no malfunction and ensuring high levels of security.

12 Claims, 15 Drawing Sheets

KEYLESS ENTRY SYSTEM FOR VEHICLE

BACKGROUND OF THE INVENTION

1. Field of the Invention

The present invention relates to a keyless entry system for a vehicle, configured to transmit an activation signal, such as an electromagnetic induction signal, for activating an electronic key from a vehicle-side transmission/reception device and to carry out predetermined control operations for vehicle-mounted devices, such as operations for locking and unlocking door locking devices, depending on predetermined encrypted signals transmitted from the activated electronic key.

2. Description of the Prior Art

In this kind of system, a detection distance within which the electronic key can receive the activation signal is required to be set properly. If the distance is not set properly, malfunctions may occur. For example, the door is not locked or unlocked although the person who holds the electronic key is near the vehicle.

In particular, the above-mentioned detection distance is very important in a system having an outside transmission antenna for transmitting the activation signal outside the vehicle interior and an inside transmission antenna for transmitting the activation signal inside the vehicle interior and configured to carry out control so that, when the person who holds the electronic key is outside the vehicle, the electronic key receives the activation signal from the outside transmission antenna and the door is locked or unlocked and so that, when the person who holds the electronic key is inside the vehicle, the electronic key receives the activation signal from the inside transmission antenna and the engine is started. In other words, if the detection distance of the outside transmission antenna is too short, a problem of not locking or unlocking the door occurs. In addition, if the detection distance of the inside transmission antenna is too long, even when the person who holds the electronic key is outside the vehicle, the electronic key responds to the activation signal from the inside transmission antenna, and the engine can be started, for example. Therefore, for example, a child not yet getting out of the vehicle may start the engine. This may cause a dangerous situation.

The above-mentioned detection distance changes depending on variations in the properties of the components of the system and also changes depending on the deterioration of the components with a lapse of time. In a conventional system, once the system is mounted on a vehicle, its detection distance cannot be changed. To change the detection distance, the system must be dismounted from the vehicle and then subjected to adjustment, replacement, etc.

SUMMARY OF THE INVENTION

The present invention is intended to solve the above-mentioned problems. A first object of the present invention is to provide a keyless entry system for a vehicle, capable of changing its detection distance even after the keyless entry system is mounted on the vehicle. A second object of the present invention is to provide a keyless entry system for a vehicle, capable of changing its detection distance by using members generally provided for the vehicle. A third object of the present invention is to provide a keyless entry system for a vehicle, the overall power consumption of which is reduced to save power.

In order to attain the above-mentioned objects, a keyless entry system for a vehicle in accordance with the present invention is configured so that a detection distance setting means for changing a detection distance within which an electronic key can receive an activation signal is provided on the vehicle and so that by carrying out predetermined operations the keyless entry system enters an adjustment mode wherein the detection distance can be changed by the detection distance setting means. With this configuration, the detection distance can be adjusted while the keyless entry system is mounted on the vehicle, whereby it is possible to attain a system causing no malfunction and ensuring high levels of security.

The predetermined operations to be carried out for the system to enter the above-mentioned adjustment mode are a predetermined number or more of times of brake pedal operations and a predetermined number or more of times of outer handle operations within a predetermined time, for example. Furthermore, in the adjustment mode, for example, one of different detection distances is selected sequentially each time the brake pedal is pressed, and by pressing and keeping the brake pedal in its pressed state for a predetermined time, the detection distance selected at that time is set as a new detection distance. With this configuration, members conventionally provided for the vehicle can be used without any modifications. The present invention can thus be attained without requiring new members.

In this type of system, a calling signal generally referred to as a reset signal is always transmitted before a coded encrypted signal is transmitted. In the present invention, a noise judgment section is used to make a judgment as to whether a received signal is a regular calling signal or not. The signal processing section of the system is activated only when the received signal is the regular calling signal. Hence, it is not necessary to always keep activating the signal processing section that requires high power consumption. As a result, the overall power consumption of the system can be reduced, and power saving can be attained.

Actual configurations and operations of the keyless entry system for a vehicle in accordance with the present invention will become apparent from the following explanations of a preferred embodiment.

DETAILED DESCRIPTION OF THE PREFERRED EMBODIMENTS

Figure 1:
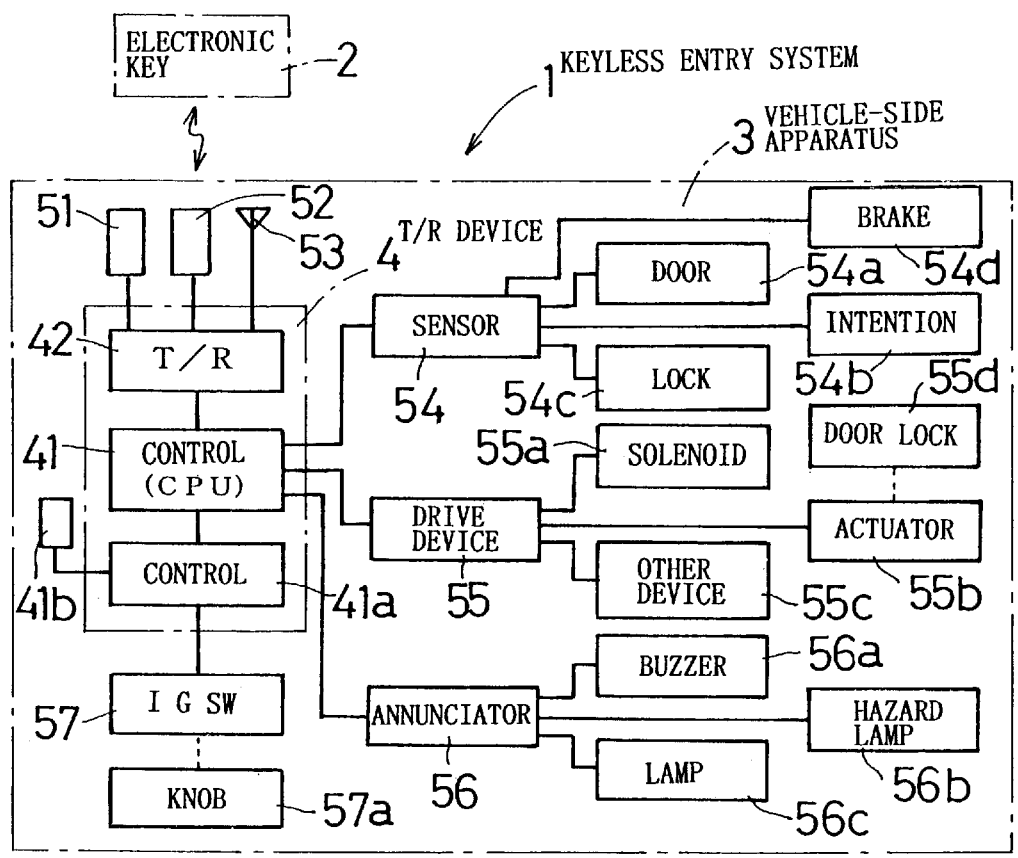
FIG. 1 is a block diagram showing the overall configuration of a keyless entry system for a vehicle in accordance with the present invention.

In FIG. 1, a block diagram showing the overall configuration of a system in accordance with the present invention, numeral 1 designates a keyless entry system in accordance with the present invention, numeral 2 designates an electronic key, numeral 3 designates a vehicle-side apparatus having a transmission/reception device 4 and related devices. This keyless entry system 1 comprising the electronic key 2 and the vehicle-side apparatus 3 has not only a simple door locking/unlocking function but also an immobilizer function capable of controlling the ON/OFF operations of the steering locking device and the ignition switch even when a battery for the electronic key 2 is exhausted.

As shown in FIG. 1, the transmission/reception device 4 of the vehicle-side apparatus 3 comprises a vehicle-side control section 41 having a CPU and a vehicle-side transmission/reception section 42. The control section 41 includes an immobilizer control circuit 41a for controlling the steering locking device (hereafter reference to as "STL") and the like, and the control circuit 41a has a dedicated antenna 41b. The control circuit 41a and the antenna 41b are disposed near the ignition switch. An inside transmission antenna 51 and an outside transmission antenna 52 for transmitting electromagnetic induction signals, and an antenna 53 for receiving response signals from the electronic key 2 are connected to the transmission/reception section 42. The inside transmission antenna 51 for transmitting signals to the electronic key 2 located inside the vehicle interior is disposed on the center console of the vehicle, for example, to transmit electromagnetic induction signals to the entire area inside the vehicle interior. The outside transmission antenna 52 for transmitting signals to the electronic key 2 located outside the vehicle interior is disposed at a center pillar positioned between the front and rear doors of the vehicle, for example.

In addition, the sensor 54, drive device 55, annunciator device 56, ignition switch 57, etc. of the vehicle are connected to the transmission/reception device 4. The sensor 54 includes various sensors, such as a door sensor 54a, an intention confirmation sensor 54b, a lock sensor 54c and a brake sensor 54d. The intention confirmation sensor 54b is a door switch that operates depending on the operation of the outer handle of the door. The brake sensor 54d is a brake switch that operates depending on the operation of the brake pedal. The switches usually provided for the vehicle are also used as the intention confirmation sensor 54b and the brake sensor 54d. The door sensor 54a is provided for each door and the trunk lid as necessary. The drive device 55 includes various drive means, such as an operation knob solenoid 55a that makes the ignition switch operation knob operable, a door locking actuator 55b and other vehicle-mounted devices 55c, as well as a door locking device 55d driven by the actuator 55b, etc., for example. Furthermore, the buzzer 56a, hazard lamp 56b, indication lamp 56c, etc. of the vehicle are used as the annunciator device 56 as necessary, for example. Numeral 57a designates the operation knob of the ignition switch.

Figure 2A:
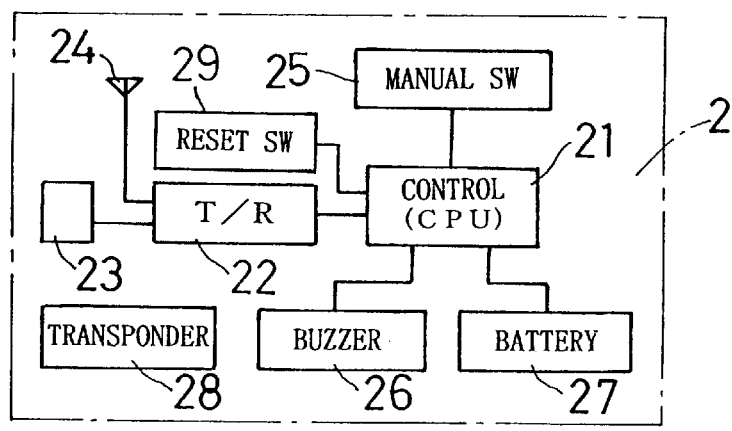
FIG. 2A is a block diagram showing the configuration of an electronic key for the above-mentioned system.
Figure 2B:
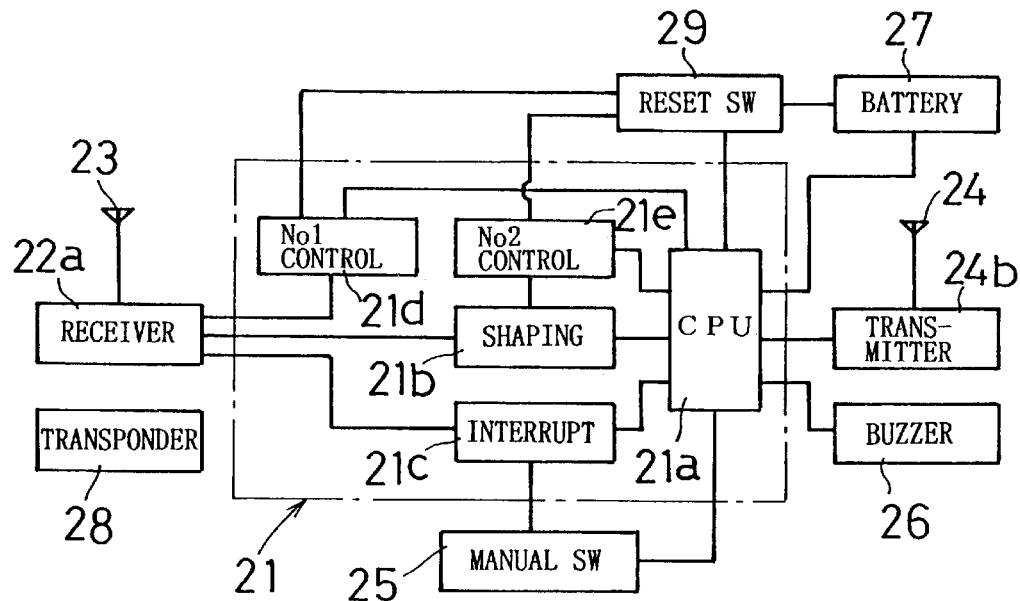
FIG. 2B is a block diagram showing the configuration of the main portion of the electronic key.

The electronic key 2 is held by the user (driver) of the vehicle as a rule and has the function of a transponder. As shown in FIG. 2A, the electronic key 2 comprises a control section 21, a transmission/reception section 22, an electromagnetic induction signal receiving antenna 23, a response signal transmitting antenna 24, a manual transmission switch 25, a buzzer 26, a power source battery 27, a transponder 28, a reset switch 29, etc. The buzzer 26 is used to generate an alarm. However, the alarm may be generated by other means using a synthesized voice, for example. As shown in FIG. 2B, the above-mentioned transmission/reception section 22 comprises an electromagnetic induction signal reception circuit 22a and a response signal transmission circuit 24b. The control section 21 comprises a CPU 21a and various circuits required for predetermined operations, such as a waveform shaping circuit 21b, an interruption control circuit 21c, a first power source control circuit 21d for controlling the power source for the reception circuit 22a and a second power source control circuit 21e for controlling the power source for the waveform shaping circuit 21b. Furthermore, the manual transmission switch 25 is used to transmit door locking and unlocking commands by manual operation.

The transponder 28 receives an electromagnetic induction signal from the dedicated antenna 41b described later, operates owing to the electromotive force of the signal and generates an identification signal corresponding to the received electromagnetic induction signal. A relatively low frequency, such as 125 kHz, is used for the electromagnetic induction signal, and a high frequency, such as 315 MHz, is used for the response signal. In addition, the electronic key 2 has the shape of a card. "Card," indicated in the flowcharts shown in FIG. 4 and the following figures, is the electronic key 2. However, the electronic key 2 may have other shapes, such as the shape of an ordinary manual operation key, that is, a manual key integrated with the circuit section of the electronic key.

Figure 3:
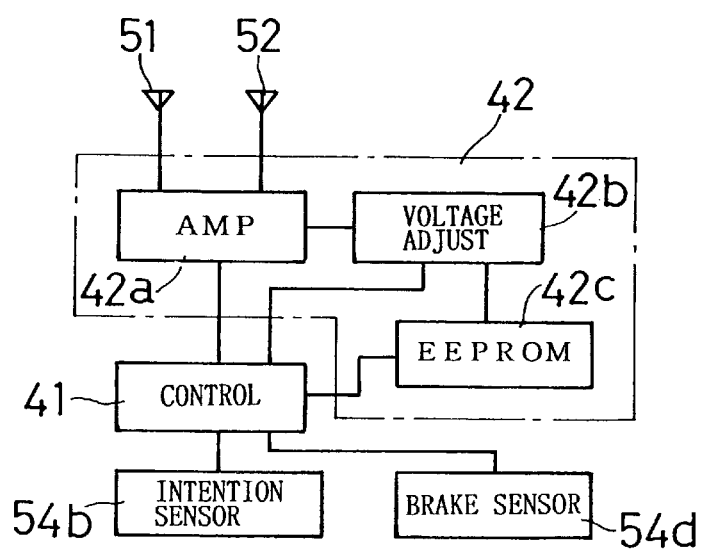
FIG. 3 is a block diagram showing the configuration of the main portion of the vehicle-side device of the above-mentioned system.

As shown in FIG. 3, the transmission/reception section 42 of the transmission/reception device 4 on the vehicle side comprises a transmission amplifier circuit 42a, a voltage adjustment circuit 42b including a constant voltage circuit, nonvolatile memory, such as EEPROM 42c, and the like. An activation signal is transmitted as described below. A predetermined voltage value stored in the EEPROM 42c is read by the control of the control section 41. A predetermined drive voltage based on this voltage value is supplied from the voltage adjustment circuit 42b to the transmission amplifier circuit 42a. An activation signal having a predetermined output corresponding to this drive voltage is transmitted from the antennas 51 and 52. In other words, in the device shown in the figure, a detection distance within which the electronic key 2 can receive the activation signal is determined depending on the preset voltage value stored in the EEPROM 42c. By disposing the two antennas so as to be orthogonal to each other and by shifting the phase of the current supplied to each antenna by 90 degrees, rotating magnetic field formation for widening the range of the magnetic field may be carried out in some cases. FIG. 3 shows the inside transmission antenna 51 and the outside transmission antenna 52, only one for each. However, two units can also be used for each antenna even in the device shown in FIG. 3. In this case, transmission is carried out at a drive voltage preset for each antenna. A procedure for presetting the drive voltage for each antenna will be described later.

The basic operation of the keyless entry system 1 having the above-mentioned configuration will be described below. The transmission/reception device 4 intermittently transmits an electromagnetic induction signal for activating the electronic key 2 from the antennas 51 and 52. The electronic key 2 receives the electromagnetic induction signal and transmits a predetermined identification signal in response with the electromagnetic induction signal. The transmission/reception device 4 receives the identification signal and outputs an operation signal in response with the identification signal. By this operation signal, for example the door locking actuator 55b is driven, and the door locking device 55d is operated to carry out locking or unlocking. This locking or unlocking state is detected by the door sensor 54a, and the result of the detection is input to the control section 41. Or it is confirmed that the person who holds the electronic key 2 has gotten into the vehicle, and engine start operation can be carried out.

The electronic key 2 is indispensable for the above-mentioned keyless entry operation. However, when the vehicle is not used and the person who holds the electronic key 2 is away from the vehicle or when the electronic key 2 is in its standby state wherein it is stored in a predetermined storage position, the electronic key 2 is put into its power saving mode wherein only the circuits required at the minimum operate. Hence, the power of the power source battery 27 having a small capacity is prevented from being exhausted uselessly, thereby preventing trouble, such as no operation due to the exhaustion of the battery.

In other words, in the standby state, only the first power source control circuit 21d and the reception circuit 22a are energized so as to be ready to receive the electromagnetic induction signal. The CPU 21a is in its hold state wherein its power consumption is less than that in its ordinary operation state in this standby state, when the electromagnetic induction signal is input, the signal is transmitted from the reception circuit 22a to the CPU 21a via the interruption control circuit 21c, and the CPU 21a is activated. The CPU 21a then controls the second power source control circuit 21e, thereby activating the waveform shaping circuit 21b. As a result, the signal received by the reception circuit 22a is read by the CPU 21a. When it is confirmed that the signal is a predetermined signal, a predetermined identification signal is sent to the transmission circuit 24b, and a response signal is transmitted to the transmission/reception device 4 of the vehicle-side apparatus 3.

After receiving the response signal in this way, the vehicle-side apparatus 3 carries out various operations as described later. However, on the side of the electronic key 2, the CPU 21a controls the second power source control circuit 21e to make the waveform shaping circuit 21b inoperative, thereby returning to the above-mentioned standby state. In the case when the manual transmission switch 25 is operated, a predetermined response signal corresponding to this operation is transmitted to the transmission/reception device 4, and an operation described later is carried out. In addition, in the case when the signal read in the CPU 21a and sent from the waveform shaping circuit 21b is not the predetermined signal, the CPU 21a judges that the signal is noise. The CPU 21a then controls the second power source control circuit 21e to make the waveform shaping circuit 21b inoperative. The response signal from the transmission circuit 24b is not transmitted, whereby the electronic key 2 returns to the above-mentioned standby state. In this way, in the standby state, the electronic key 2 enters its power saving mode wherein only the circuits required at the minimum operate. As a result, the power source battery 27 is prevented from being exhausted.

Furthermore, in the case when the operation returning to the standby state after noise input occurs continuously many times beyond a predetermined number of times, the CPU 21a judges that an abnormal state, such as a theft, has occurred, and activates the buzzer 26 to issue an alarm. Then, the CPU 21a turn off all the circuits to which power is supplied, thereby preventing the power source battery 27 from being exhausted uselessly. This state is canceled by operating the reset switch 29. The electronic key 2 then returns to the above-mentioned standby state.

Figure 4:
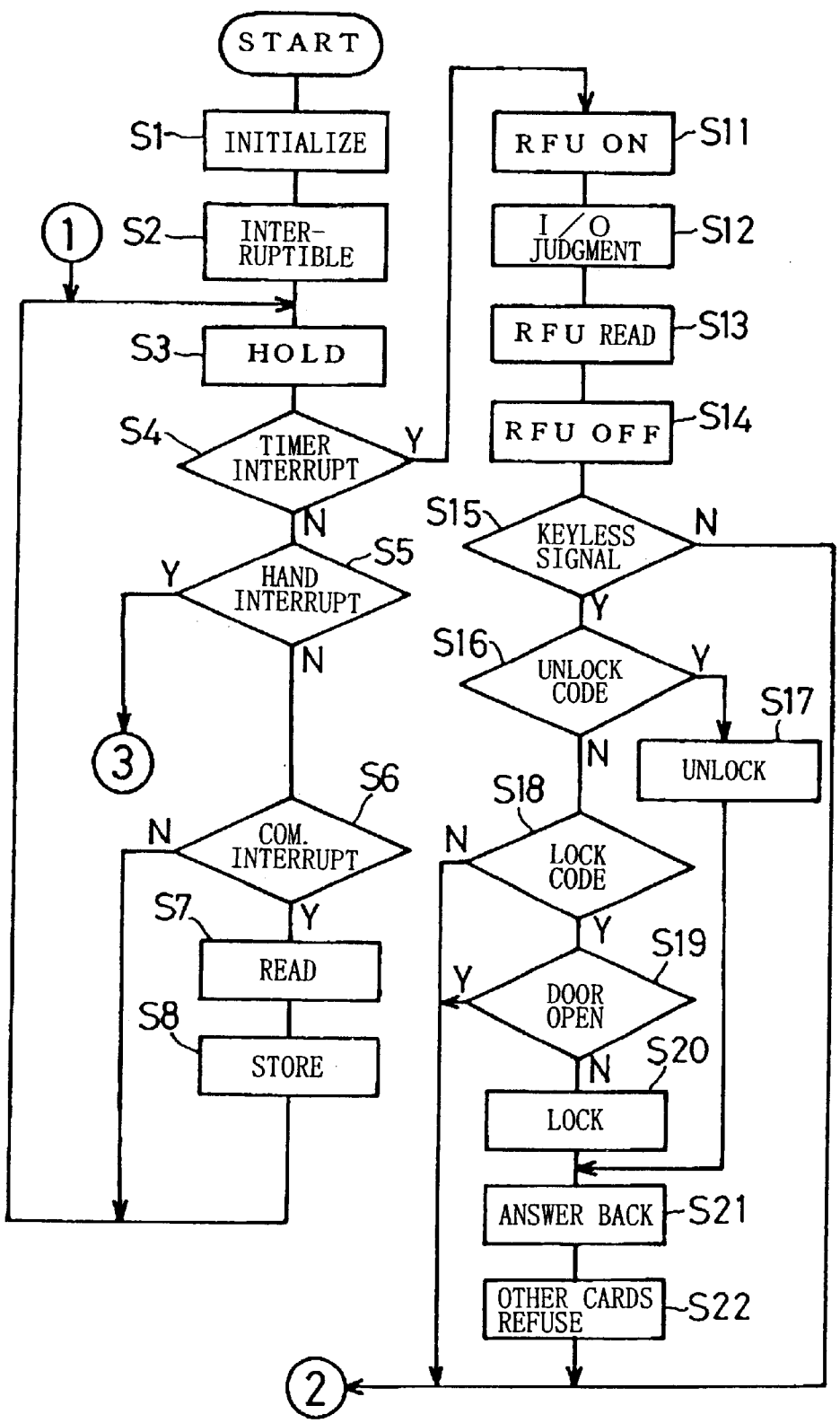
FIG. 4 is a flowchart showing the basic operation of the vehicle-side device of the above-mentioned system.
Figure 5:
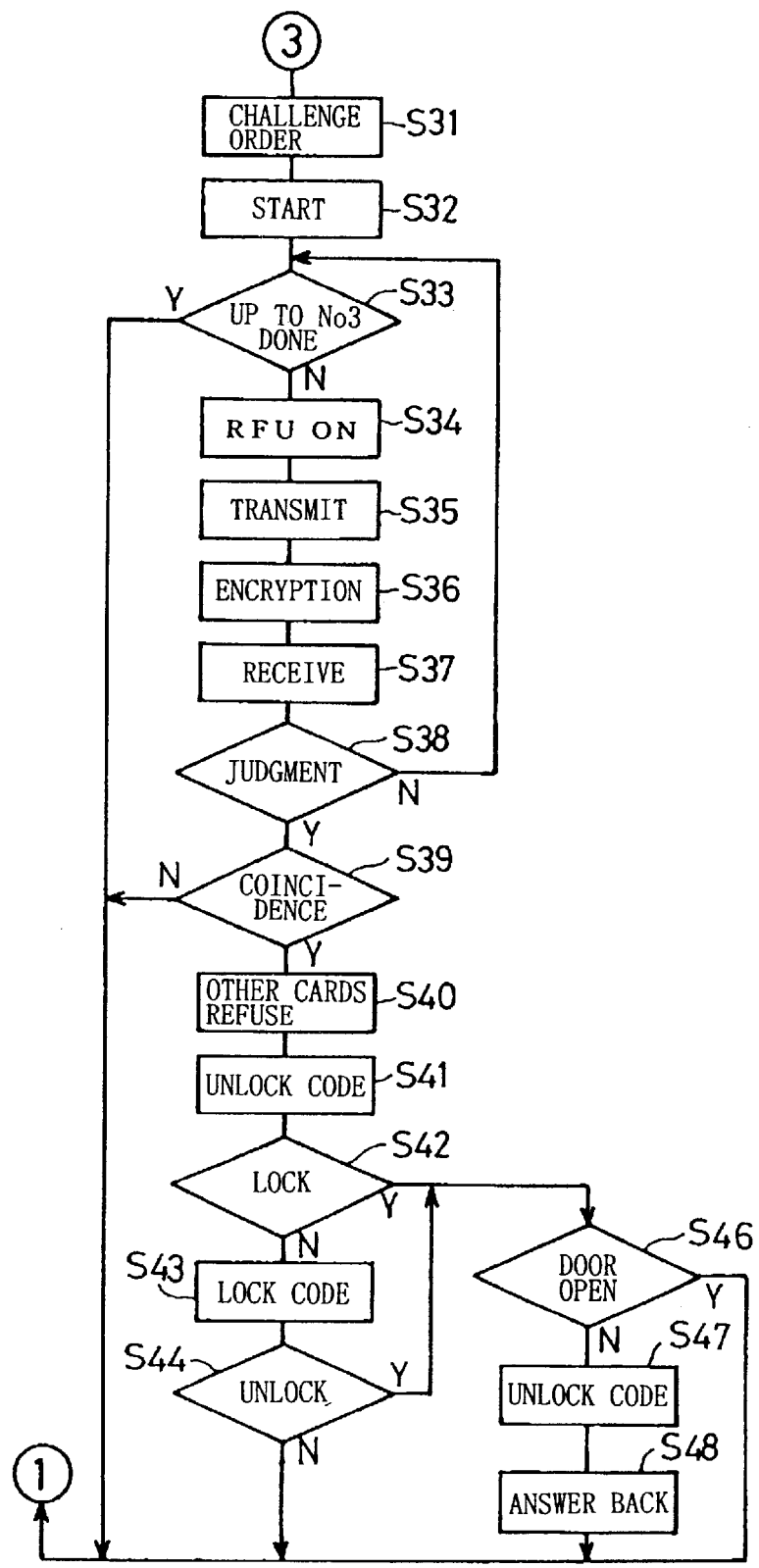
FIG. 5 is a flowchart showing the basic operation of the vehicle-side device.
Figure 6:
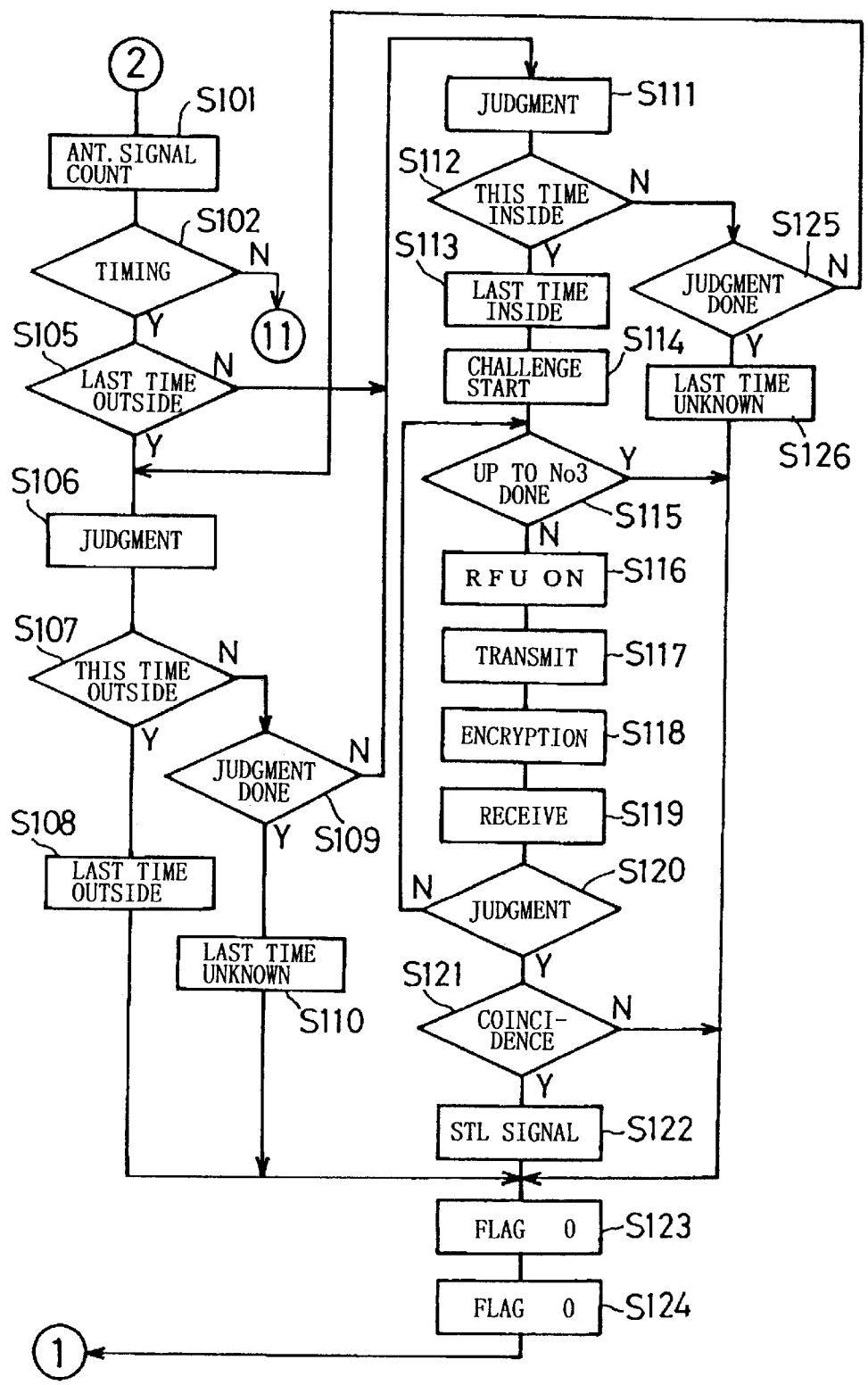
FIG. 6 is a flowchart showing the basic operation of the vehicle-side device.
Figure 7:
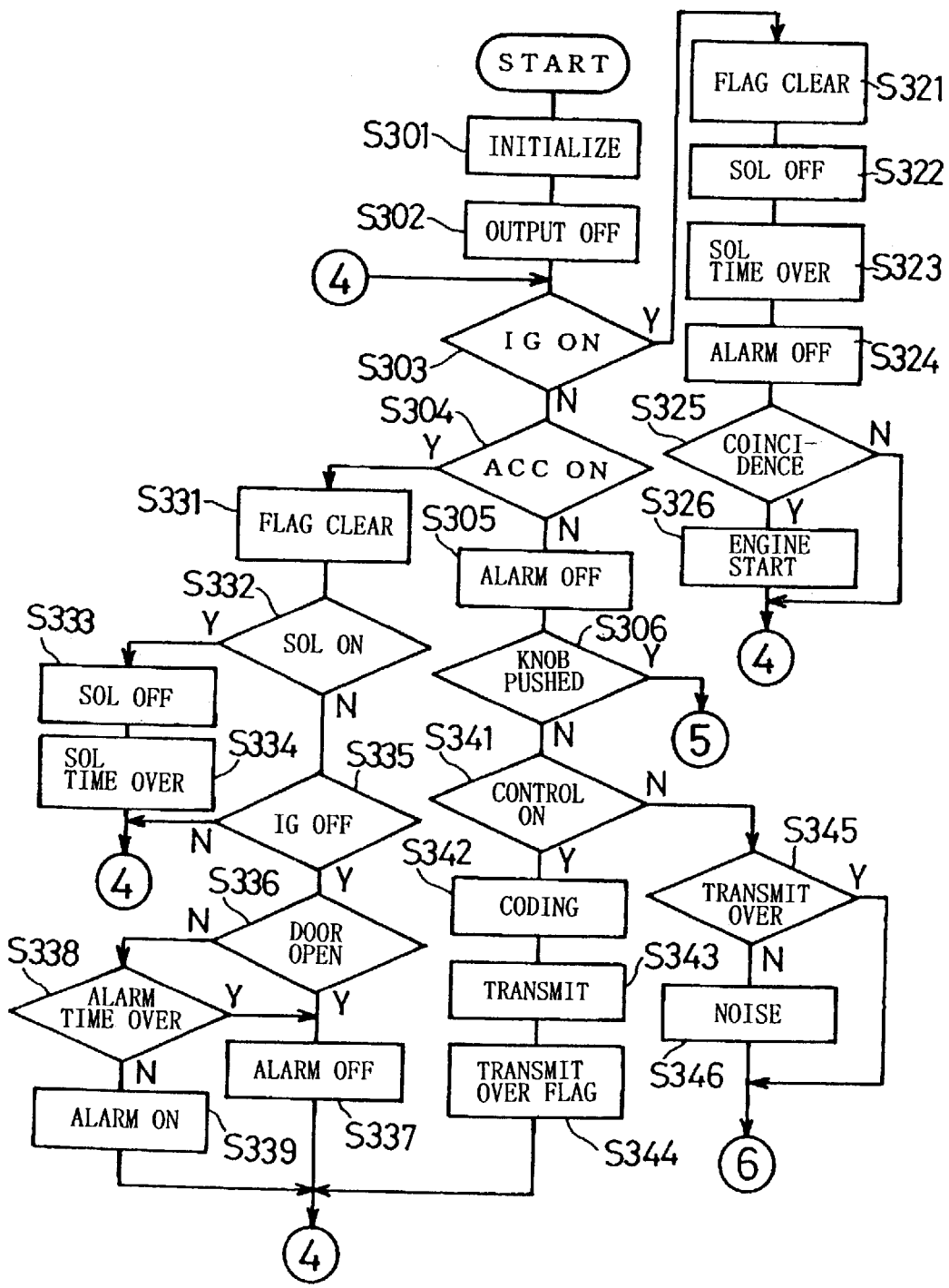
FIG. 7 is a flowchart relating to the control of the steering locking device of the above-mentioned system.
Figure 8:
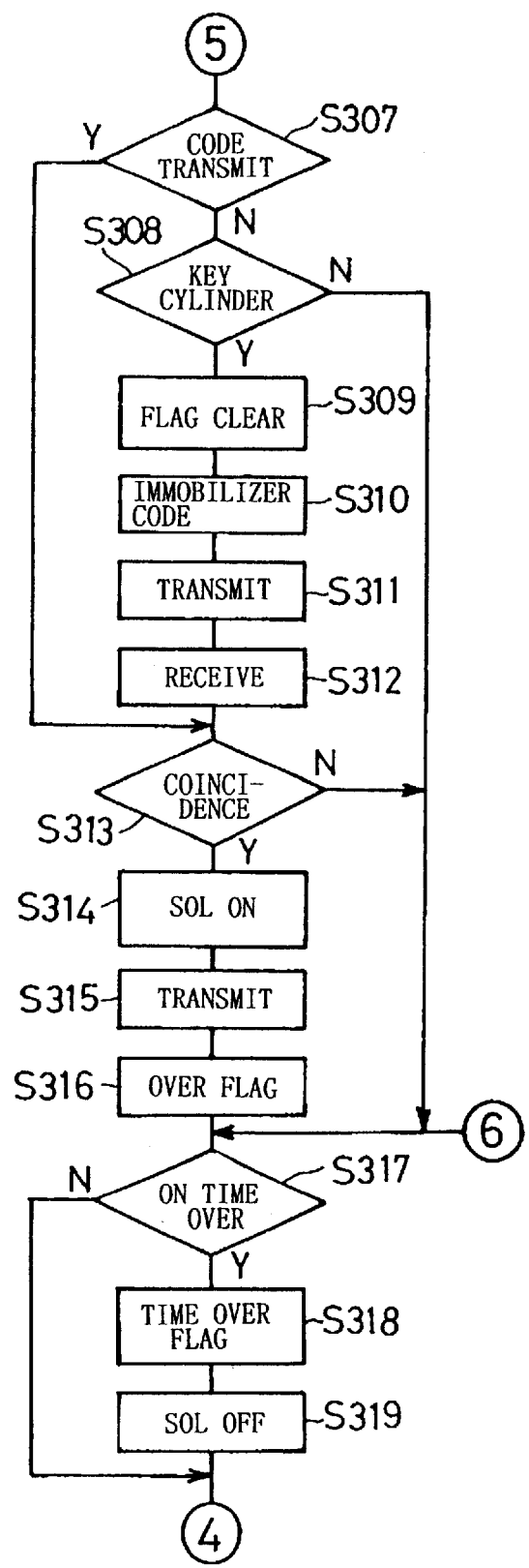
FIG. 8 is a flowchart relating to the control of the above-mentioned steering locking device.
Figure 9:
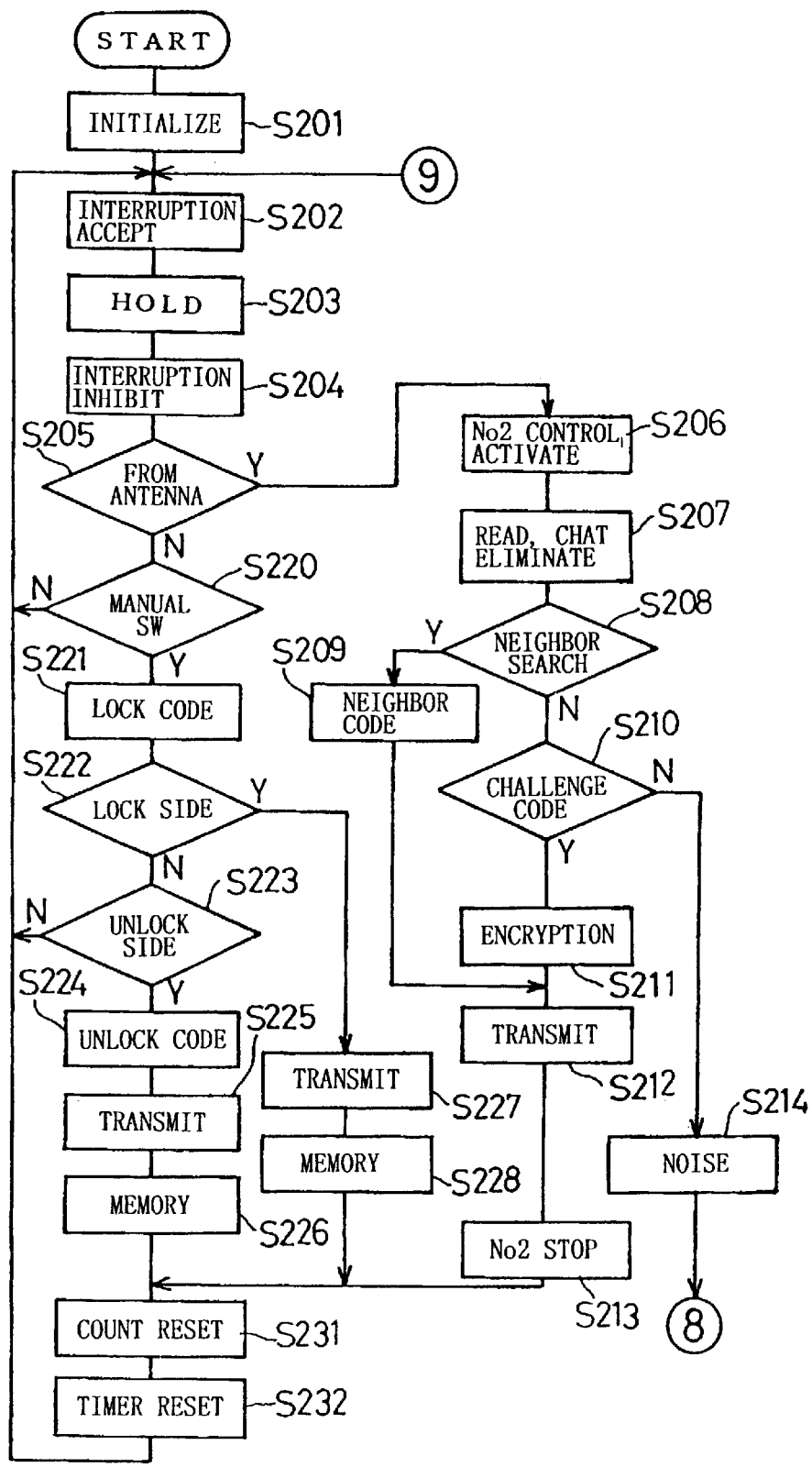
FIG. 9 is a flowchart showing the basic operation of the electronic key of the above-mentioned system.
Figure 10:
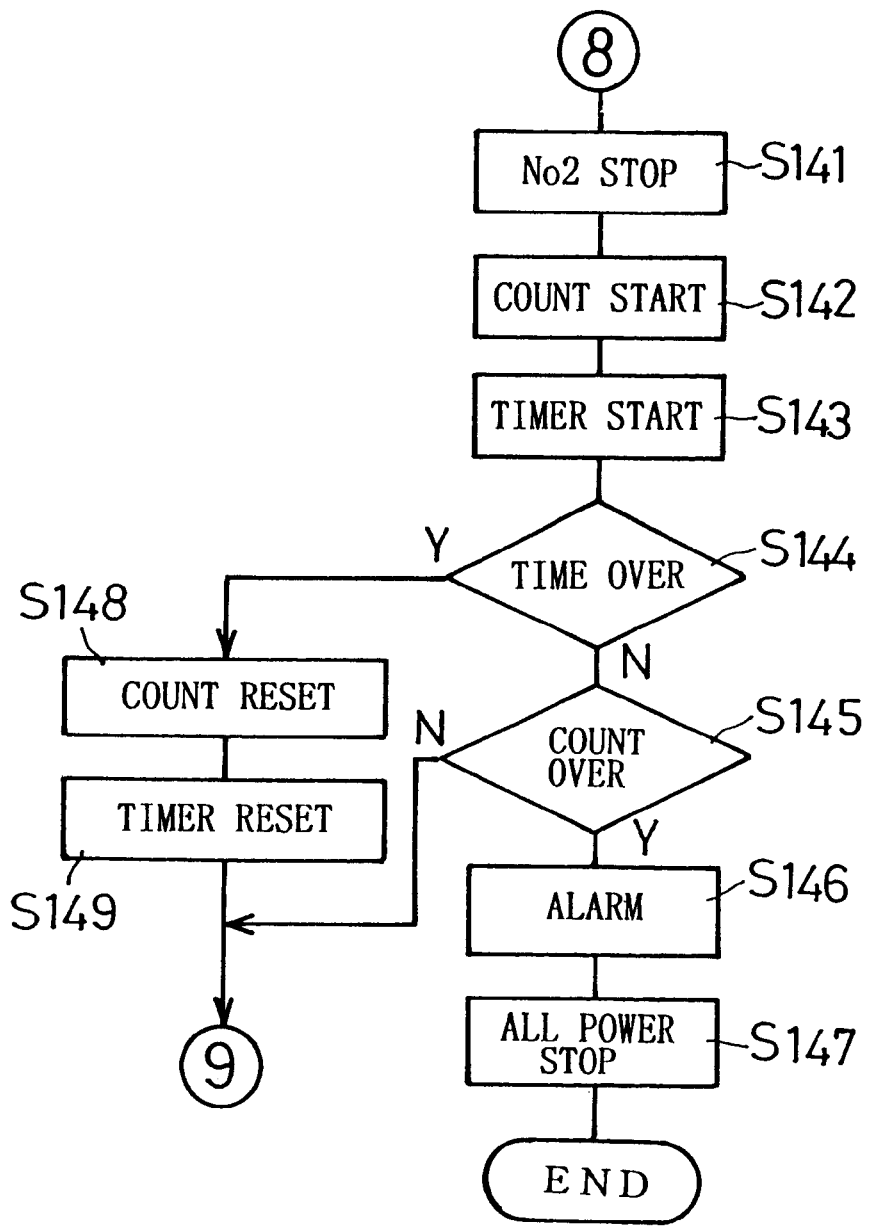
FIG. 10 is a flowchart showing the basic operation of the electronic key.

The operations of the overall system will be described below referring to the accompanying flowcharts. These operations are carried out in accordance with control programs stored in the control section 41. FIGS. 4 to 6 are flowcharts showing the basic operation of the control section 41 of the vehicle-side apparatus 3. FIGS. 7 and 8 are flowcharts showing the operation of the control circuit 41a relating to steering locking control. FIGS. 9 and 10 are flowcharts showing the basic operation of the control section 21 of the electronic key 2. FIGS. 11 to 14 are flowcharts showing the operation in an adjustment mode.

Referring to FIG. 4, the transmission/reception device 4 is initialized at step S1 and becomes interruptible at step S2. While the state of transmitting the electromagnetic induction signal from the antennas 51 and 52 is maintained, the sequence advances to HOLD at step S3, and the transmission/reception device 4 stands by. The transmission of the electromagnetic induction signal may be carried out continuously in principle. However, the transmission is herein carried out intermittently, that is, the signal is transmitted for 0.1 second at intervals of 0.68 seconds, for example. This is useful for reducing the exhaustion of the power source battery and the like. In this state, when the person who carries the electronic key 2 approaches the vehicle within one meter therefrom, for example, the operation on the side of the electronic key 2 shown in FIG. 9 starts.

Referring to FIG. 9, at step 201, the battery 27 is turned on and the electronic key 2 is initialized. The sequence advances to step S202 wherein external interruption is made possible so as to be ready to receive the input of various signals. Then, at step S203, the CPU of the control section 21 is held and becomes a suspension state. At step S204, signal input other than that from the antennas, that is, external interruption, is inhibited to prevent malfunction. When the electromagnetic induction signal is input from the antenna 23, a judgment is made at step S205 as to whether the input signal is transmitted from the antenna or not. If the input signal is transmitted from the antenna, the sequence advances to step S206, and the second power source control circuit 21e is activated, and the waveform shaping circuit 21b is activated. At step S207, the waveform shaping circuit 21b reads the signal and eliminates chattering and the like to correct the signal.

At the next step S208, a judgment is made as to whether the input signal is a neighborhood search signal or not. If the input signal is the neighborhood search signal, the sequence advances to step S209, and a neighborhood code for response is set. This neighborhood code is not required to be encrypted but should only be used for response. If the input signal is not the neighborhood search signal at step S208, the sequence advances to step S210, and a judgment is made as to whether the input signal is a challenge code or not. If the input signal is a challenge code, it is encrypted at step S211. This challenge will be described later. At step S212, the signal having been set at step S209 or S211 is transmitted from the antenna 24. At step S213, the second power source control circuit 21e is stopped and the waveform shaping circuit 21b is stopped. Furthermore, if the input signal is not a challenge code at step S210, the sequence advances to step S214. At step S214, it is judged that the input signal is not a regular signal but noise. The sequence advances to the procedure shown in FIG. 10.

Additionally, when it is judged that the input signal is not transmitted from the antenna at step S205, the sequence advances to the step S220. At the step S220, a judgment is made as to whether the signal is generated by the operation of the manual transmission switch 25 or not. If the signal is not generated by the operation of the manual transmission switch 25, the sequence returns to step S202. If the signal is generated by the operation of the manual transmission switch 25, a locking command code is generated at step S221. If the manual transmission switch 25 is not set at its locking side at step S222, the sequence advances to step S223. If the manual transmission switch 25 is set at its unlocking side, an unlocking command code is generated at step S224. At step S225, the code is transmitted as an RF (radio frequency) signal from the transmission antenna 24. Furthermore, if the manual transmission switch 25 is set at its locking side at step S222, the sequence advances to step S227. The locking command code is transmitted as an RF (radio frequency) signal from the transmission antenna 24. For the next code setting, these command codes are stored in the memory of the control section 21 at steps S226 and S228.

In the procedure shown in FIG. 10, the second power source control circuit 21e is stopped at step S141. At step S142, a counter built in the CPU 21a is activated to start counting the number of input times of the signal that was judged as noise at step S214. Furthermore, at step S143, a timer built in the CPU 21a is activated. When a predetermined time has passed, the sequence advances from step S144 to S148. At step S148, the counter is stopped and is reset. Furthermore, at step S149, the timer is stopped and reset. The sequence returns to step S202. Until the predetermined time passes, the sequence advances from step S144 to S145. Until the count value reaches a predetermined value, the sequence just returns to step S202. When the count value reaches the predetermined value, the sequence advances to step S146. At step S146, the buzzer is activated to issue an alarm. Furthermore, the sequence advances to step S147, and all the power sources are stopped. When the reset switch 29 is operated in this state, the sequence returns to step S202 via step S201, although this is not shown in FIG. 10.

After steps S213, S226 and S228 shown in FIG. 9, the sequence advances to steps S231 and S232. At these steps, the counter is stopped and reset, and the timer is stopped and reset. After these steps, the sequence returns to step S202.

The transmission/reception device 4 for receiving the above-mentioned unlocking and locking command codes carries out reading at intervals of 0.68 seconds, just as in the case of the transmission of the electromagnetic induction signal. Hence, the transmission of each command code is carried out for 1.4 seconds, that is, more than two times the reading interval, so that the code can be read securely regardless of the timing of the reading. In the period, the code is output twice.

In the above-mentioned step S212, when the neighborhood code for response is transmitted from the electronic key 2, the sequence advances from step S4 to step S11 in the operation of the transmission/reception device 4. At step S1, the receiving module unit (hereafter referred to as "RFU") of the transmission/reception section 42 turns ON. At step S12, an I/O reading judgment is carried out to confirm the most up-to-date state of the input and output. After a signal is read at step S13, the RFU is turned OFF at step S14. At step S15, a judgment is made as to whether the signal having been just read is a keyless signal, that is, a signal generated by the operation of the manual transmission switch 25, or not.

If the signal is a keyless signal, a judgment is made at step S16 as to whether the signal is an unlocking command code or not. If the signal is the unlocking command code, an unlocking signal is output to the door locking actuator 55b, and the door is unlocked at step S17. If the signal is not the unlocking command code, a judgment is made at step S18 as to whether the signal is a locking command code or not. If the signal is the locking command code, a judgment is made at step S19 as to whether the door is open or not depending on the signal of the door sensor 54a. If the door is not open, a locking signal is output to the actuator 55b to lock the door. When unlocking or locking is carried out by these procedures, a response is sent back. For example, at step S21, when unlocking is carried out, the hazard lamp 56b flashes once. When locking is carried out, the hazard lamp 56b flashes twice. The sequence then advances to step S22. In the case when there are two or more electronic keys 2, the electronic key being operated now has priority, and the signals from the other electronic keys are not accepted. The sequence then advances to step S101 shown in FIG. 6. The priority process at step S22 will be described referring to FIG. 5.

When the signal is not a keyless signal at step S15, when the signal is not the locking command code at step S18, and when the door is open at step S19, the sequence directly advances to step S101 shown in FIG. 6.

Next, a location determination routine for making a judgment as to whether the electronic key 2 is located outside or inside the vehicle will be described referring to FIG. 6. This location judgment is not made at all times, but once in every five times of the transmission of the electromagnetic induction signal. Hence, the number of the times the antenna signal is output is counted at step S101. At step S102, a judgment is made as to whether the current time is appropriate timing for judging the location of the electronic key 2 or not. If the current time is the appropriate timing for the judgment, the sequence advances to step S105. If the current time is not the appropriate timing for the judgment, the sequence advances to step S401 shown in FIG. 11 and the system enters an adjustment mode described later.

Since the location of the electronic key 2 at the last time is usually unknown at step S105, the sequence advances from step S111 to step S112, and a judgment is made as to whether the electronic key 2 is located inside the vehicle interior or not. This judgment is made as to whether the electronic key 2 responds to a search signal from the inside transmission antenna 51 or the outside transmission antenna 52 at the time when the neighborhood code is transmitted at step S212. Since the electronic key 2 is located outside the vehicle interior this time, the sequence advances to step S125. Since the outside-the-vehicle judgment is not yet made, the sequence advances to step S106, and the outside-the-vehicle judgment is made. Since the electronic key 2 is located outside the vehicle interior this time, it is memorized at step S108 that the electronic key 2 was located outside the vehicle interior the last time. At steps S123 and S124, judgment flags are set at zero, that is, a not-yet-judged state, so as to be ready for the next judgment. The sequence then returns to step S3.

If the result of the judgment at the above-mentioned step S16 is the unlocking command code, the door has been unlocked, the person who holds the electronic key 2 can open the door and get into the vehicle. After this, the sequence advances from step S101 to step S102 and step S105. Since the electronic key 2 was located outside the vehicle interior the last time, steps S106 and S107 are executed. Since the electronic key 2 is not located outside the vehicle interior this time, the sequence advances to step S109. Since the inside-the-vehicle judgment is not yet made, steps S111 and S112 are executed. Since the electronic key 2 is located inside the vehicle interior this time, it is memorized at step S113 that the electronic key 2 was located inside the vehicle the last time, and the sequence advances to step S114. The keyless entry system described herein is provided with three electronic keys 2, that is, No. 1 to No. 3 electronic keys. "Challenge" at step S114 means an inquiry about the priority setting of the electronic keys. By the setting, the order in accordance with which the signals for the electronic keys 2 are output is set.

At the next step S115, a judgment is made as to whether the processes up to the No. 3 electronic key have been completed or not. If not completed, the procedure from step S116 to step S120 is repeated. In other words, at step S116 the RFU is turned ON. The voltage value stored in the EEPROM 42c is read and sent to the voltage adjustment circuit 42b, and the challenge signal of the output depending on the voltage value is transmitted at step S117. At step S118, the transmitted signal is encrypted. When the electronic key 2 receives this challenge signal, it returns an encrypted signal at step S211 shown in FIG. 9. The RFU receives this signal at step S119. At step S120, a judgment is made as to whether the received signal is a predetermined code or not. If the received signal is a predetermined code, the code is checked at step S121. If there is a coincidence, the sequence advances to step S122. At step S122, an STL control signal described later is transmitted to the control circuit 41a, and steps S123 and S124 are executed. The sequence then returns to step S3.

When the person who holds the electronic key 2 gets out of the vehicle after this state, the sequence advances from step S101 to steps S102 and S105. Since the electronic key 2 was located inside the vehicle interior last time, steps S111 and S112 are executed. Since the electronic key 2 is not located inside the vehicle interior this time, the sequence advances to step S125. Since the outside-the-vehicle judgment is not yet made, the sequence advances to step S106, and the outside-the-vehicle judgment is made. Since the electronic key 2 is located outside the vehicle interior this time, it is memorized at step S108 that the electronic key 2 was located outside the vehicle interior the last time. The sequence returns to steps S3 via steps S123 and S124.

Furthermore, in the case when the person who holds the electronic key 2 is far away from the vehicle, the sequence advances from step S101 to step S107. Since communication with the electronic key 2 cannot be carried out, it is judged that the electronic key 2 is not located outside the vehicle interior, and the sequence advances to step S109. Since the inside-the-vehicle judgment is not yet made, the sequence advances to step S111. Since communication with the electronic key 2 cannot be carried out, it is judged that the electronic key 2 is not located inside the vehicle interior, and the sequence advances to step S125. Since the outside-the-vehicle judgment has already been made, the sequence advances to step S126. At step 5126, it is set that the location of the electronic key 2 at the last time is unknown. The sequence returns to step S3 via steps S123 and S124. In the case when the inside-the-vehicle judgment has already been made at step S109, it is also set that the location of the electronic key 2 at the last time is unknown, and the sequence returns to step S3 via steps S123 and S124.

In addition to the locking and unlocking operations by the manual transmission switch 25 described in the procedure at step S15 and the following steps, this system has general functions as a keyless entry system for automatically locking and unlocking the door depending on the location of the electronic key 2. When using the general functions, the intention confirmation sensor 54b provided for the vehicle-side apparatus 3 is required to be operated. Furthermore, the ignition switch 57 is also controlled by the electronic key 2 by using the immobilizer function. The switch provided at the outer handle of the door for example is used as the intention confirmation sensor 54b. Since the above-mentioned operations for automatically locking and unlocking the door depending on the location of the electronic key 2 are general operations, these operations are not included in the flowchart shown in FIG. 9.

Next, the operation of the system when the intention confirmation sensor 54b is operated will be described below. In the hold state at step S3 shown in FIG. 4, when the person, holding the electronic key 2 and having an intention to open the door, makes contact with the intention confirmation sensor 54b, this contact is detected. The sequence advances from step S4 to step S5 and further advances to step S31 shown in FIG. 5. At step S31, the order in accordance with which plural electronic keys 2 are processed is determined, and the sequence advances to step S32. At step S32, the processes at step S33 and the following steps are carried out in accordance with the determined order.

The procedure from step S33 to step S38 is similar to that from step S115 to step S120 described referring to FIG. 6. The same procedure is repeated for the three electronic keys 2. In this case, since the signal to be transmitted to the electronic key 2 is not a neighborhood search signal but a challenge code, an encrypted signal is transmitted from the electronic key 2. If the code is not a predetermined code, the sequence returns to step S33. At step S33, the next challenge code is transmitted. If the code is a predetermined code, the code is checked at step S39. If there is a coincidence, the sequence advances to step S40. A mode wherein the signals from the electronic keys 2 having lower priority are refused is set at step S40. The electronic key having the highest priority is, for example, an electronic key that is transmitting signals when the intention confirmation sensor 54b is operated, an electronic key whose manual transmission switch 25 is operated, an electronic key that is used frequently, an electronic key that is located outside the vehicle, an electronic key that is transmitting signals right now, an electronic key that is used last, etc. The electronic key having the highest priority can be selected or set in advance.

At step S41, an unlocking command code is set, and the sequence advances to step S42. Since the door is locked at this time, the lock sensor 54c detects the locked state of the door, and the sequence advances from step S42 to step S46. Since the door is closed, the door sensor 54a detects the closed state of the door at step S46. At step S47, an unlocking signal is output to the door locking actuator 55b to unlock the door. At step S48, the unlocked state of the door is made known by sending a response. For example, the hazard lamp 56b flashes twice. The sequence then returns to step S3. The person who holds the electronic key 2 can now get into the vehicle.

After the person gets into the vehicle, the sequence advances from step S101 to steps S102 and S105. Since the electronic key 2 was located outside the vehicle interior the last time, steps S106 and S107 are executed. Since the electronic key 2 is not located outside the vehicle interior this time, the sequence advances to step S109. Since the inside-the-vehicle judgment is not yet made, steps S111 and S112 are executed. Since the electronic key 2 is located inside the vehicle interior this time, the sequence advances from step S113 to steps S114 and S115. Steps S115 to S120 are executed. If the check at step S121 is proper, the sequence advances to step S122. At step S122, an STL control signal is transmitted to the control circuit 41a, and the control circuit 41a starts its operation. When the operation knob 57a is not pushed (this state is not shown) and when the STL control signal is not transmitted for 10 or more seconds, the control circuit 41a stops operating, thereby completing the procedure.

When control circuit 41a starts its operation, it is initialized at step S301, and its output is turned OFF at step S302. The sequence then advances to step S303. Since the ignition switch 57 and the ACC are OFF at this time, steps S303, S304 and S305 shown in FIG. 7 are executed, and the sequence advances to step S306. The ignition switch 57 of the system shown in the figure is structured so that the engine can be started by pushing and turning the operation knob 57a. At step S306, the state of the switch for detecting that the operation knob 57b is at its pushed position is checked. Since the operation knob 57b is not pushed, the sequence advances to step S341.

Since the STL control signal is transmitted from the control section 41 this time, the control section 41 is in an activated state. Hence, the sequence advances to step S342, and a code is processed. At step S343, the code is transmitted to the control section 41. At step S344, a flag indicating the completion of the code processing is set. When the result of the code processing is transmitted, steps S3 to S6 shown in FIG. 4 are executed. At step S6, it is judged that a communication terminal interrupt has occurred, and the sequence advances to step S7. After data is read, the result of the code processing is stored at step S8.

Then, the operation knob 57a is pushed to start the engine. This time, the sequence advances from step S306 to step S307 shown in FIG. 8. At step S307, a judgment is made as to whether the code encrypted or processed for certification communication has been transmitted or not. Since the code processed at steps S342 to S344 has already been transmitted, and the flag indicating the completion of the transmission has already been set at step S344, it is judged that the transmission of the code is completed, and the sequence advances to step S313. At step S313, the code is checked. If the code is a regular signal, steps S314 to S319 are executed. At step S314, drive output to the operation knob solenoid 55a is delivered. In addition, for example, the indication lamp 56c provided at the tip of the operation knob 57a is lit to indicate that the operation knob 57a is ready to be pushed. At step S315, the code that was judged as a regular code at step S313 is transmitted to the control section 41. At step S316, a flag indicating the completion of the transmission is set.

At step S317, a judgment is made as to whether a predetermined time has passed or not. Until the predetermined passes, the sequence returns to step S303. After the predetermined time has passed, a flag indicating that the predetermined time for the output to the operation knob solenoid 55a has passed is set at step S318. At step S319, the output to the operation knob solenoid 55a is stopped to turn OFF the solenoid 55a. Hence, the STL is unlocked, and the drive output to the operation knob solenoid 55a is delivered only for a predetermined time. The operation knob 57a can be pushed further and can be turned from the ACC position to the ON position, whereby the engine can be started.

After the operation knob 57a is turned to the ON position, the sequence advances from step S303 to step S321. At step S321, the flag indicating the completion of the transmission is cleared. Then, steps S322 to S324 are executed. At step S322, the output to the operation knob solenoid 55a is stopped to turn OFF the solenoid 55a even when the predetermined time has not passed. At step S323, the output to the operation knob solenoid 55a sets a flag indicating that the predetermined time has passed. At step S324, the alarm having been turned ON at step S339 described later is turned OFF. The sequence advances to step S325. At step S325, the code is checked, and a judgment is made as to whether the code coincides with a regular signal or not. If the code coincides, engine energization is allowed and the engine is started. If the code does not coincide, the sequence just returns to step S303. Hence, even if the operation knob 57a is turned to the ON position, the engine cannot be started.

When the operation knob 57a is returned to stop the engine and when the ACC is turned OFF, steps S303 to S306 are executed. The sequence then advances to step S341. At the timing when the control section 41 has been activated, the sequence advances to step S342. At the timing when the control section 41 has not been activated, the sequence advances via step S345 to step S317 shown in FIG. 8. Since the predetermined drive time of the solenoid has passed, steps S318 and S319 are executed, and the sequence returns to step S303. In the case when it is judged that code transmission is not completed, the sequence advances from step S345 to step S346. At step S346, it is judged that the signal is noise.

When the user of the vehicle stops the engine and opens the door to get out of the vehicle while the ignition switch is at the ACC position, the sequence advances from step S304 to step S331. At step S331, a flag indicating the completion of the transmission is cleared. At step S332, a judgment is made as to whether the operation knob solenoid 55a is ON or OFF. In other words, a judgment is made as to whether a predetermined time has passed or not after the output to the operation knob solenoid 55a. Since the flag indicating that the predetermined time has passed has been set at step S323 this time, the sequence advances to step S335. However, when the operation knob is operated and turned to the ACC position during the output to the solenoid 55a before starting the engine, the sequence advances from step S332 to step S333. Even when the predetermined time has not passed, the output is stopped, thereby turning OFF the solenoid 55a. At step S334, a flag indicating that the predetermined time has passed is set. At step S335, a judgment is made as to whether the ignition switch is deactivated or not. Since the engine was stopped and the operation knob was set to the ACC position, the ignition switch is deactivated. The sequence advances to step S336. If the door is opened, the sequence advances to step S338.

At step S339, the alarm is turned ON for a predetermined time. For example, the buzzer 56a generates an alarm sound. When the predetermined has passed, the sequence advances from step S338 to step S337, and the alarm is turned OFF. If the user of the vehicle gets out of the vehicle and goes away from the vehicle while the ignition switch 57 is at the ACC position, the STL control signal is not transmitted. If this state continues for 10 or more seconds, the control circuit 41a stops operating, thereby completing the procedure. Hence, even if another person gets into the vehicle and turns the ignition switch from the ACC position to the ON position, the engine cannot be started. In addition, even if the control circuit 41a is started by pushing the operation knob 57a, code inconsistency occurs at step S325, and the engine cannot be started either.

The sequence advances directly from step S307 to step S313 shown in FIG. 8 as described above in the case when the battery 27 of the electronic key 2 is active. If the battery 27 is exhausted, the control section 41 of the electronic key 2 does not operate at all. For this reason, the person who holds the electronic key 2 must open the door by using a manual key and get into the vehicle. In this case, after getting into the vehicle, the person places the electronic key 2 near the ignition switch 57 and pushes the operation knob 57a. The transponder 28 of the electronic key 2 receives an electromagnetic induction signal transmitted from the antenna 41 and starts operation owing to the energy of the signal. In other words, when the operation knob 57a are pushed, the operation of the control circuit 41a starts, and steps S301 to S306 are executed. The sequence then advances from step S306 to step S307. Since code signal transmission is not completed at this step, the sequence advances to step S308.

Since a key cylinder is operated by key operation this time, the sequence advances further to step S309 and the following steps. At steps S310 and S311, a predetermined code is output to the electronic key 2, and the transponder 28 of the electronic key 2 returns the predetermined code. This code is received by the antenna 41b at step S312. If the code is a regular signal at step S313, the sequence advances to step S314. The STL is unlocked as described above, and the engine can be started. In this way, even if the battery 27 of the electronic key 2 is exhausted, the person who holds the electronic key 2 can unlock the door, get into the vehicle and carry out desired operations. In this case, both the manual key and the electronic key 2 are necessary simultaneously. Hence, the electronic key integrated with the manual key can be used conveniently for the user.

The system shown in the figure has both door locking/unlocking and STL control functions. The identification signal for locking/unlocking is an encrypted signal obtained by encrypting the challenge code output from the outside transmission antenna 52 when the intention confirmation sensor 54b is operated. The identification signal for the STL control is an encrypted signal obtained by encrypting the challenge code output from the inside transmission antenna 51 when it is judged that the electronic key 2 is located inside the vehicle interior. The challenge code is changed at each output operation, whereby a signal being different at each output operation is output. Hence, encryption is necessary at each output operation. The change is carried out according to a standard preset by both the electronic key 2 and the vehicle-side transmission/reception device 4. In the case when plural electronic keys 2 are available, a challenge code different for each electronic key. Hence, when a specific challenge code is output, a specific electronic key corresponding to the challenge code returns a neighborhood code. Therefore, the transmission/reception device 4 can recognize which electronic key 2 is used for communication.

Figure 11:
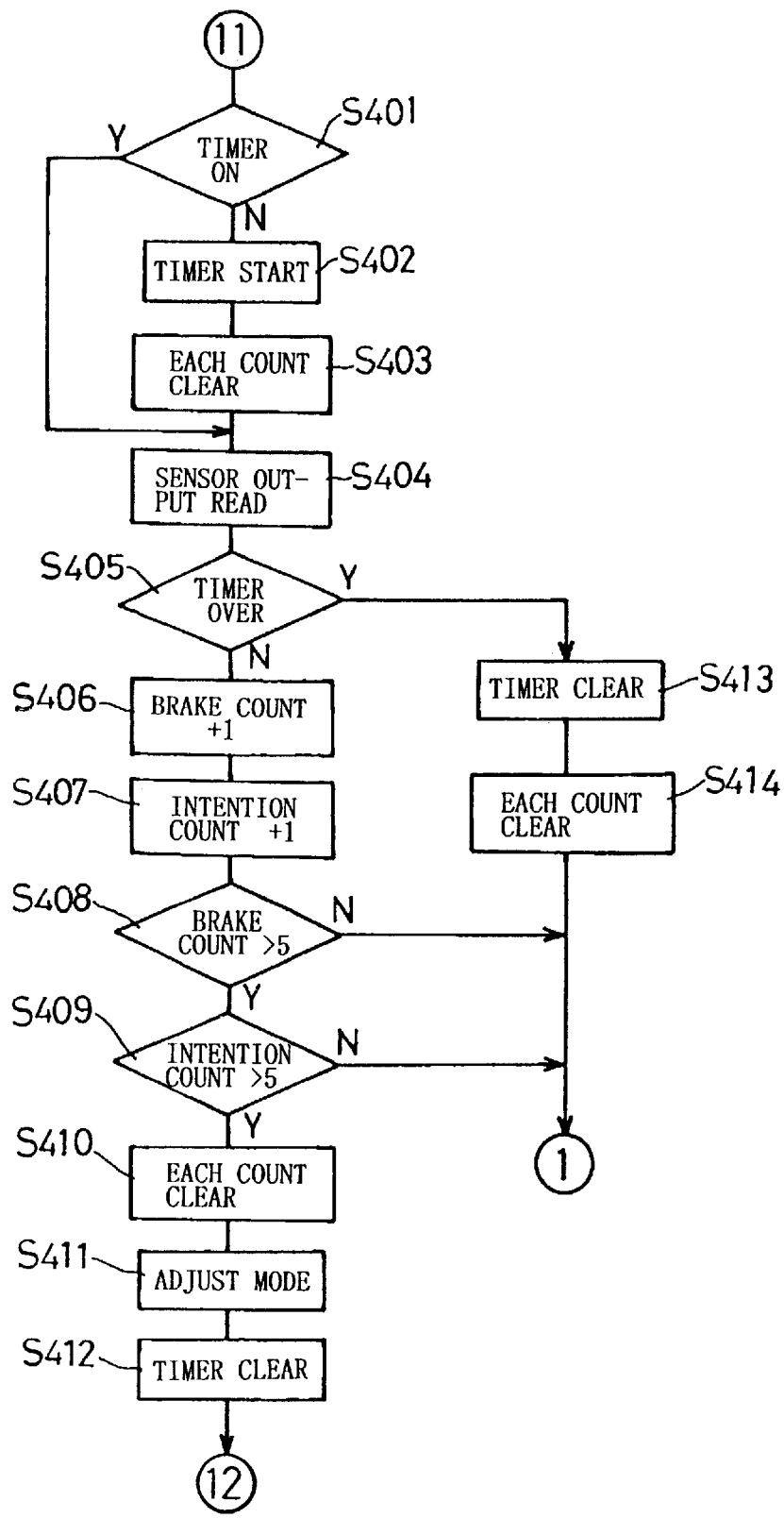
FIG. 11 is a flowchart showing the operation of the above-mentioned system in the adjustment mode thereof.
Figure 12:
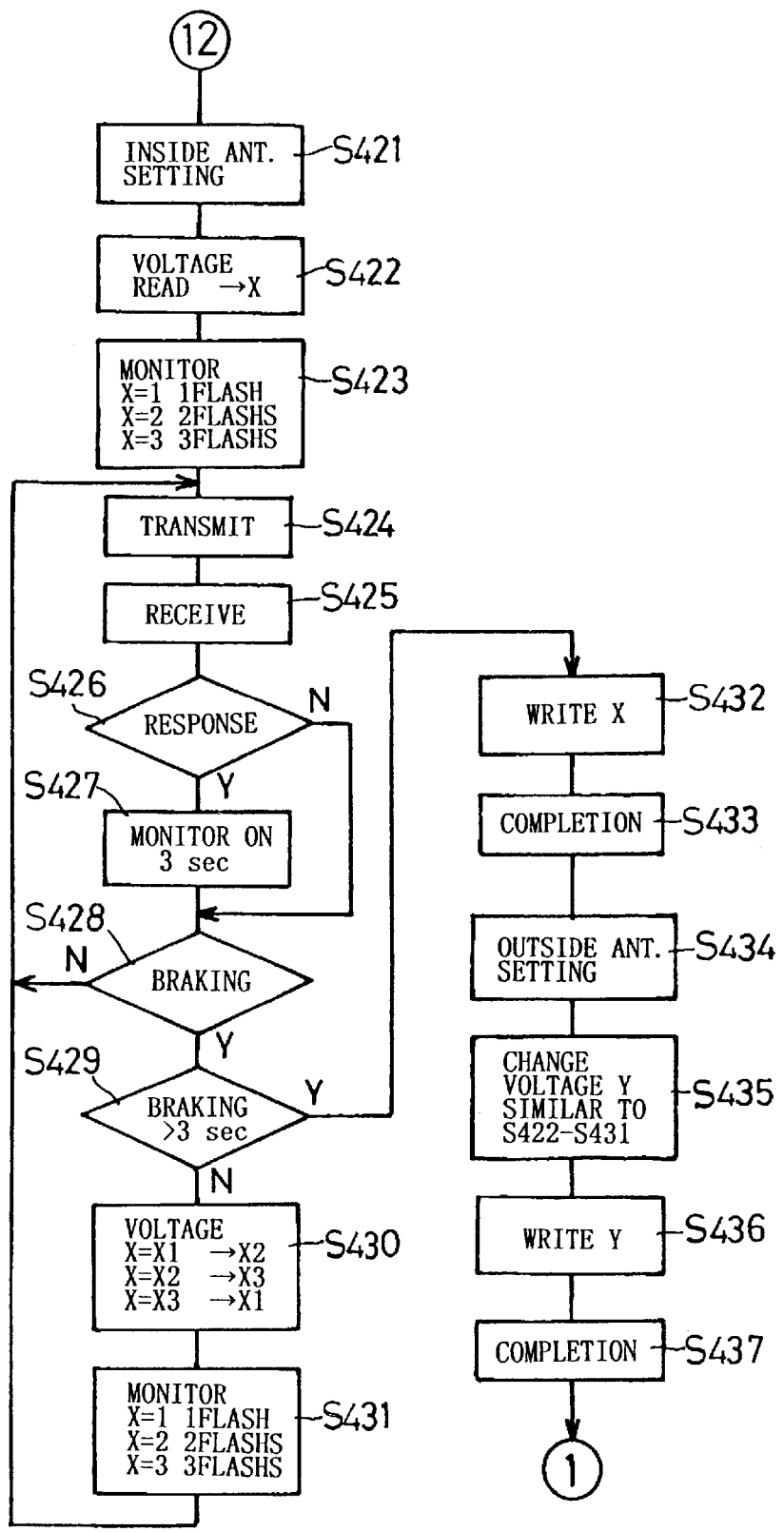
FIG. 12 is a flowchart showing the operation of the above-mentioned system in the adjustment mode thereof.
Figure 13:
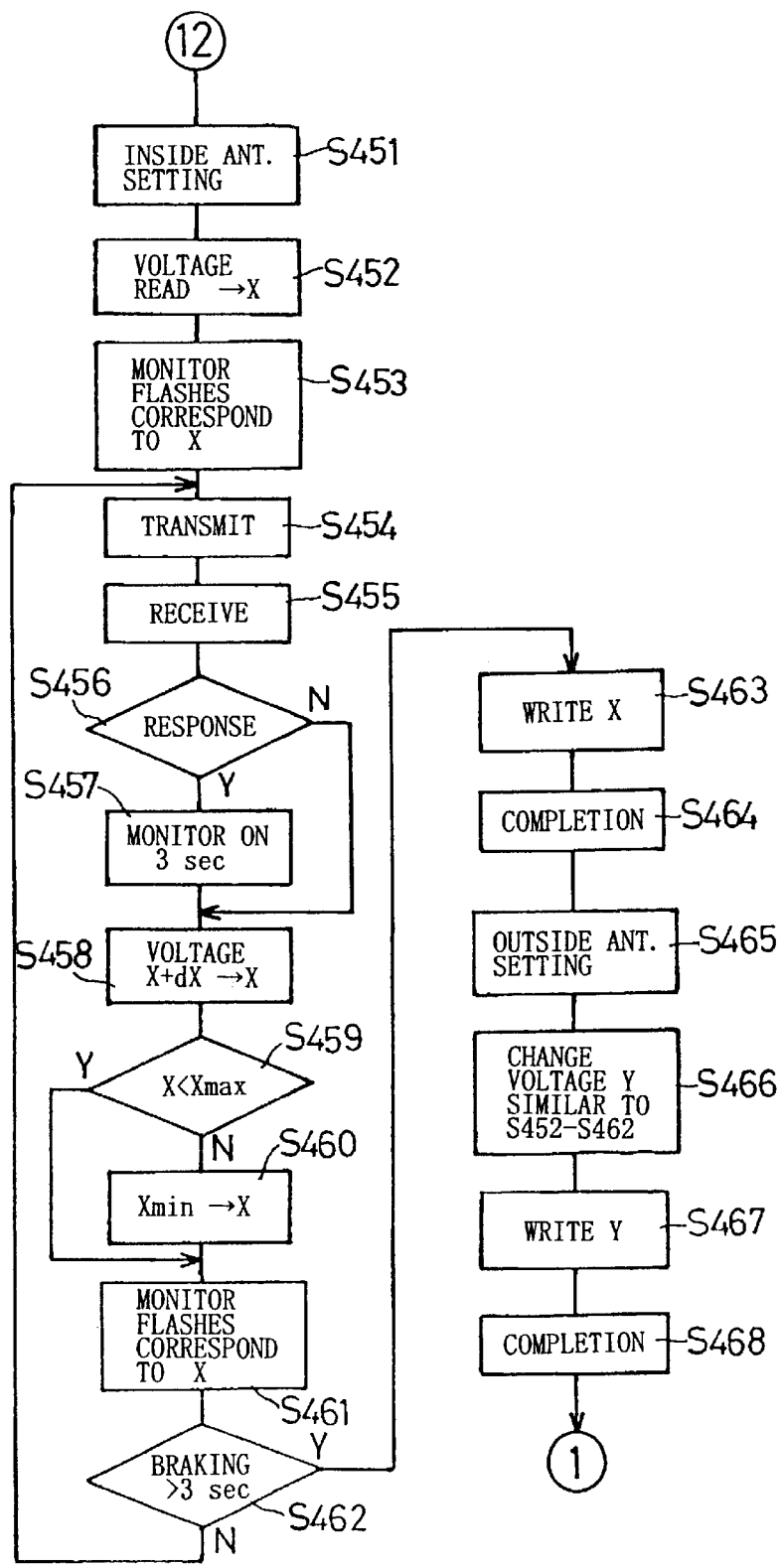
FIG. 13 is a flowchart showing the operation of the above-mentioned system in the adjustment mode thereof.
Figure 14:
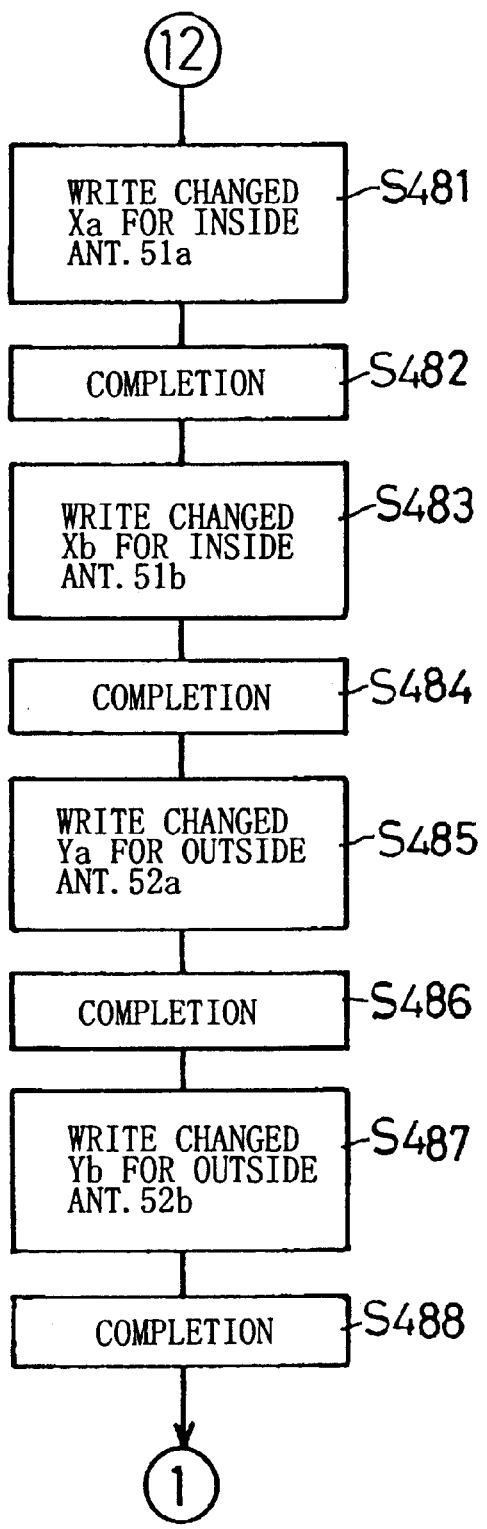
FIG. 14 is a flowchart showing the operation of the above-mentioned system in the adjustment mode thereof.

The operations of the overall keyless entry system are described above. Next, the operations in the adjustment mode in accordance with the present invention will be described below referring to flowcharts shown in FIGS. 11 to 14. FIG. 11 is a flowchart showing a procedure to be carried out when the system enters the adjustment mode. FIG. 12 is a flowchart showing a procedure for three-step adjustment. FIG. 13 is a flowchart showing a procedure for multi-step adjustment. FIG. 14 is a flowchart showing a procedure in the case when two inside transmission antennas 51 and two outside transmission antennas 52 are provided.

In the present invention, the system enters the adjustment mode by carrying out predetermined operations. In the embodiment shown in the figure, the predetermined operations required as conditions for the system to enter the adjustment mode are pressing the brake pedal five or more times and operating the outer handle five or more times within a predetermined time. The pressing of the brake pedal is detected by the brake sensor 54d, that is, the brake switch activated depending on the operation of the brake pedal. In addition, the operation of the outer handle is detected by the intention confirmation sensor 54b, that is, the door switch activated depending on the operation of the outer handle. The vehicle-side control section 41 includes a timer for performing detection as to whether these operations have been carried out within a predetermined time or not and further includes counters for counting the numbers of operation times of the sensors 54d and 54b.

When the sequence advances from step S102 shown in FIG. 6 to step S401 shown in FIG. 11, a judgment is first made as to whether the above-mentioned timer is counting or not. If the system is not in the adjustment mode, the timer is not counting. Hence, the timer is started at step S402. At step S403, the counts of the operation times of the intention confirmation sensor 54b and the brake sensor 54d are cleared, and the sequence advances to step S404. At step S404, the output signal of each sensor is read. At the next step S405, a judgment is made as to whether the count of the timer exceeds a preset value or not. If the count does not exceed the preset value, the count for the brake sensor 54d is incremented by one at step 406, and the count for the intention confirmation sensor 54b is incremented by one at step 407.

Until these counts reach five, the sequence returns from steps S408 and S409 to step S3, and the abovementioned operations are repeated. In the case of this repetition, the sequence advances directly from step S401 to step S404. If the count of the timer exceeds the preset value during this repetition, the sequence advances from step S405 to step S413. At step S413, the timer is stopped and its value is cleared. At step S414, the counts for the sensors 54b and 54d are cleared, and the sequence returns to step S3. Furthermore, if each of the counts reaches five until the timer overflows, the sequence advances to step S410, and these counts are cleared. At step S411, it is recognized that the system has entered the adjustment mode. The sequence advances to step S412. At step S412, the timer is stopped and its value is cleared. The sequence shifts to the adjustment procedure shown in FIGS. 12 to 14. The three-step adjustment shown in FIG. 12 or the multiple-step adjustment shown in FIG. 13 is set in advance, or one of them can be selected when the system enters the adjustment mode.

In the case of the three-step adjustment shown in FIG. 12, setting for the inside transmission antenna 51 first starts at step S421. At step S422, the current preset voltage value X stored in the EEPROM 42c is read. At step S423, the value is indicated on a progress monitor provided in a part of the meter panel. This indication is performed as described below. The voltage value X is one of three different preset values X1, X2 and X3 (X1<X2<X3) and indicated by the number of times of flashing for one second. In other words, when X is X1, one flash occurs; when X is X2, two flashes occur; and when X is X3, three flashes occur. During this adjustment, the electronic key 2 is placed at a desired distance (position). Transmission and reception are carried out at steps S424 and S425. At step S426, depending on the presence or absence of a response, a judgment is made as to whether the electronic key 2 is within the detection distance wherein the electronic key 2 can receive the activation signal or not. If a response is present, the progress monitor lights continuously for three seconds at step S427 to indicate that the activation signal has been received.

Each time the brake pedal is pressed, one of the three different values is selected sequentially as the voltage value X. Hence, by pressing the brake pedal while checking the presence or absence of a response from the electronic key 2, it is possible to select a voltage value at which the electronic key 2 can receive the activation signal within the desired detection distance. In other words, when the brake sensor 54d is activated by pressing the brake pedal, the sequence advances from step S428 to step S429. In the case when the brake is pressed for less than three seconds, if the voltage value is X1, the voltage value is changed to X2; if the voltage value is X2, the voltage value is changed to X3; and if the voltage value is X3, the voltage value is changed to X1 at step S430. In this way, the voltage value is changed sequentially. At step S431, a newly selected value is indicated in a way similar to that at step S423. A voltage value depending on the desired detection distance is selected by repeating steps S424 to S431 as necessary. By pressing and keeping the brake pedal in its pressed state for three or more seconds after the selection, the sequence advances from step S429 to step S432. The voltage value X selected at that time is written in the EEPROM 42c as a new preset voltage value. This completes the setting for the inside transmission antenna, and the sequence advances from step S433 to step S434.

The setting procedure for the outside transmission antenna 52 is carried out at step 434 and the following steps. At step S435, the preset voltage value Y of the outside transmission antenna 52 is changed in a way similar to the procedure from step S422 to step S431. The result is written in the EEPROM 42c at step S436. This completes the setting for the outside transmission antenna, and the sequence returns from step S437 to step S3.

In the above description, the three-step adjustment is taken as an example. FIG. 13 shows an example of multi-step adjustment wherein finer adjustment is carried out. The presence or absence of a response from the electronic key 2 is checked while a small constant value is added to the voltage value successively, whereby the voltage value is changed to a value wherein the desired detection distance can be obtained. In other words, the procedure from step S451 to step S457 shown in FIG. 13 is similar to that from step S421 to step S427 shown in FIG. 12. At step S458, a preset addition value dX is added to the voltage value X to increment the voltage value by one step. This voltage value is changed automatically at constant time intervals when there is no response at step S456. The result is indicated by the progress monitor at step S461. This indication is carried out by the number of times of flashing in one second depending on the voltage value selected at that time. When the voltage value after the change has reached the maximum value Xmax, the minimum value Xmin is selected at steps S459 and S460. The above-mentioned addition of dX restarts from this value.

Hence, after the presence or absence of a response from the electronic key 2 is checked by the indication at step S457 and when a desired voltage value is obtained by the repetition of the procedure from step S454, the user of the vehicle presses and keeps the brake pedal in its pressed state for three or more seconds. The sequence thus advances from step S462 to step S463. The voltage value X selected at that time is written in the EEPROM 42c as a new preset voltage value. This completes the setting for the inside transmission antenna, and the sequence advances from step S464 to step S465. The procedure at step S465 and the following steps is an outside transmission antenna setting procedure. The preset voltage value Y of the outside transmission antenna is changed in a way similar to the procedure from step S452 to step S462. The result is written in the EEPROM 42c at step S467. This completes the setting for the outside transmission antenna. The sequence returns from step S468 to step S3.

As described above, the detection distances of the inside transmission antenna 51 and the outside transmission antenna 52 are determined depending on the preset voltage values stored in the EEPROM 42c. The preset voltage values are set for the inside transmission antenna 51 and the outside transmission antenna 52 separately. However, in the case when plural units are available for both the inside transmission antenna 51 and the outside transmission antenna 52, the preset voltage value is set for each antenna. FIG. 14 shows an example of a procedure in the case when two units are available for both the inside transmission antenna 51 and the outside transmission antenna 52.

Step S481 is a setting step for a first inside transmission antenna 51a. A desired voltage value Xa is selected and written in the EEPROM 42c. An actual procedure for the setting is similar to that shown in FIG. 12 or FIG. 13. This completes the setting for the first inside transmission antenna 51a, and the sequence advances from step S482 to step S483 for the setting of a second inside transmission antenna 51b. Similarly, a voltage value Xb is selected and written in the EEPROM 42c, and the sequence advances from step S484 to step S485. In accordance with the following procedure similar to the above-mentioned procedure, a voltage value Ya is selected for a first outside transmission antenna 52a at steps S485 and S486, and a voltage value Yb is selected for a second outside transmission antenna 52b at steps S487 and S488. These values are written in the EEPROM 42c. This completes a series of setting changes. As described above, the preset voltage value for determining the detection distance is changed for each antenna.

This type of keyless entry system for a vehicle is required to be in a standby state at all times so that the system can perform its predetermined operations when the person who holds the electronic key approaches the parked vehicle within the detection distance. In the present invention, the activation signal is transmitted intermittently as described above. This reduces battery power consumption due to standby power. In addition, a configuration described below is used to further save power.

In other words, in this type of system, a calling signal generally referred to as a reset signal is always transmitted before a coded encrypted signal is transmitted. In the present invention, attention is paid to this point. A noise judgment section is used to make a judgment as to whether a received signal is a regular calling signal or not. The signal processing section of the system is activated only when the received signal is the regular calling signal. Hence, it is not necessary to always keep activating the signal processing section that requires high power consumption. As a result, the overall power consumption of the system can be lowered, and power saving can be attained.

Figure 15:
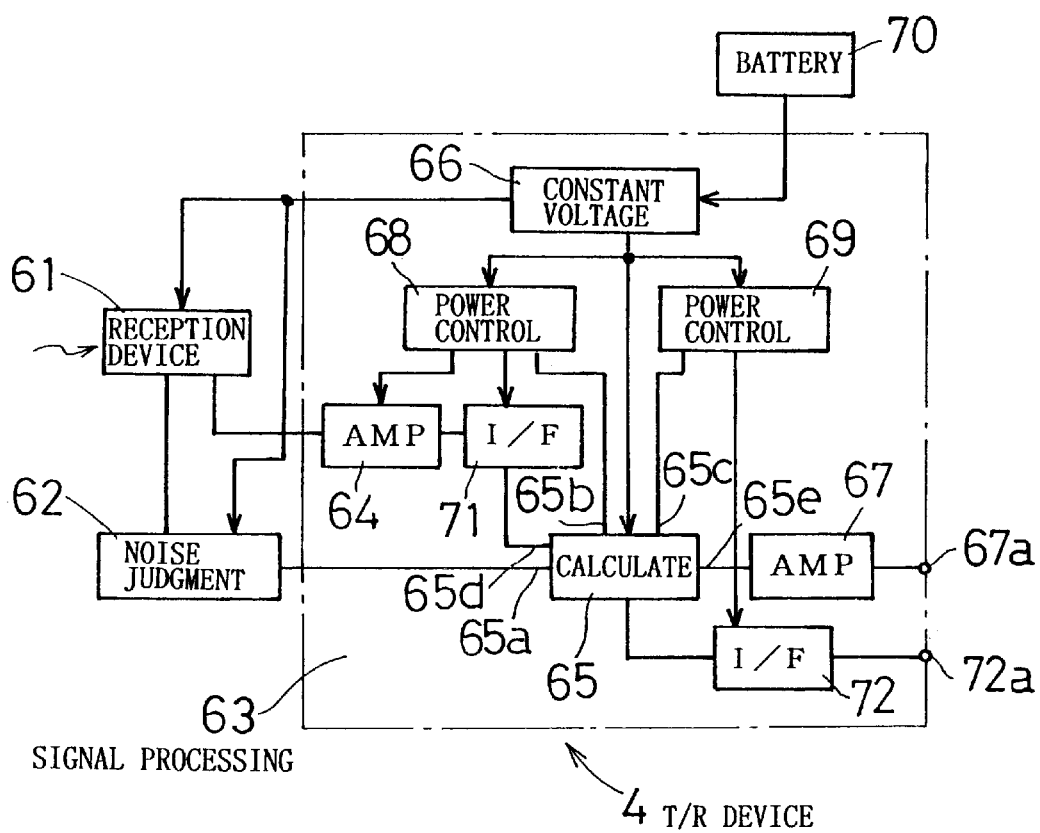
FIG. 15 is a block diagram showing the configuration of the main portion of a noise judgment section and a signal processing section in the vehicle-side device of the above-mentioned system.
Figure 16:
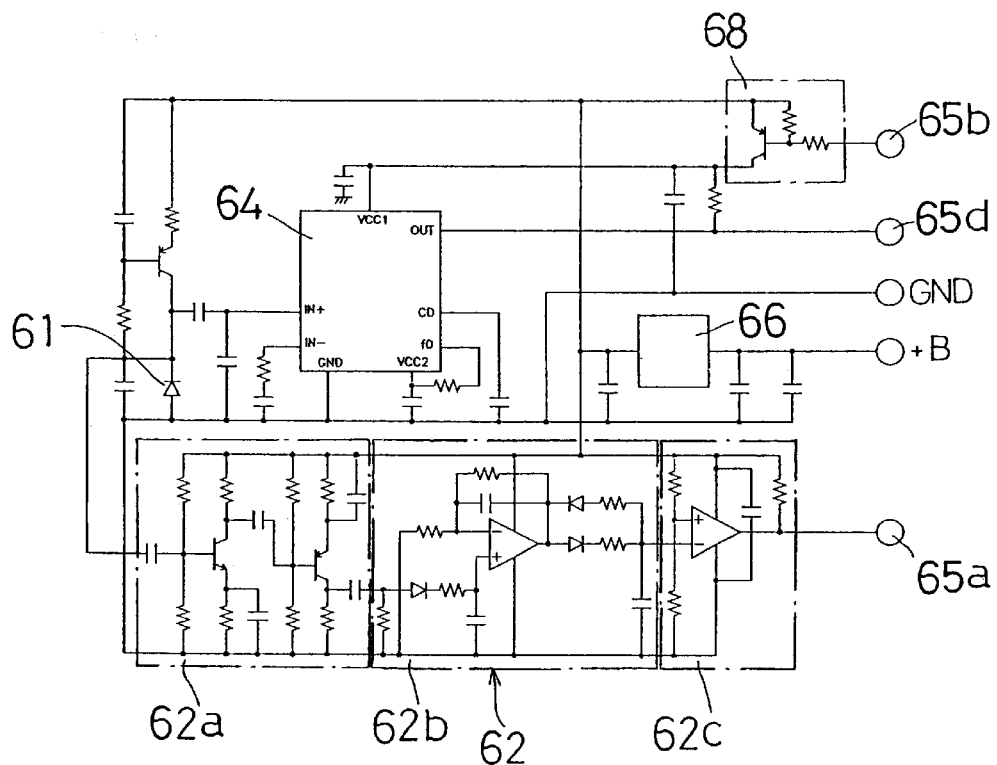
FIG. 16 is a circuit diagram showing an example of an actual circuit configuration of the above-mentioned main portion.
Figure 17:
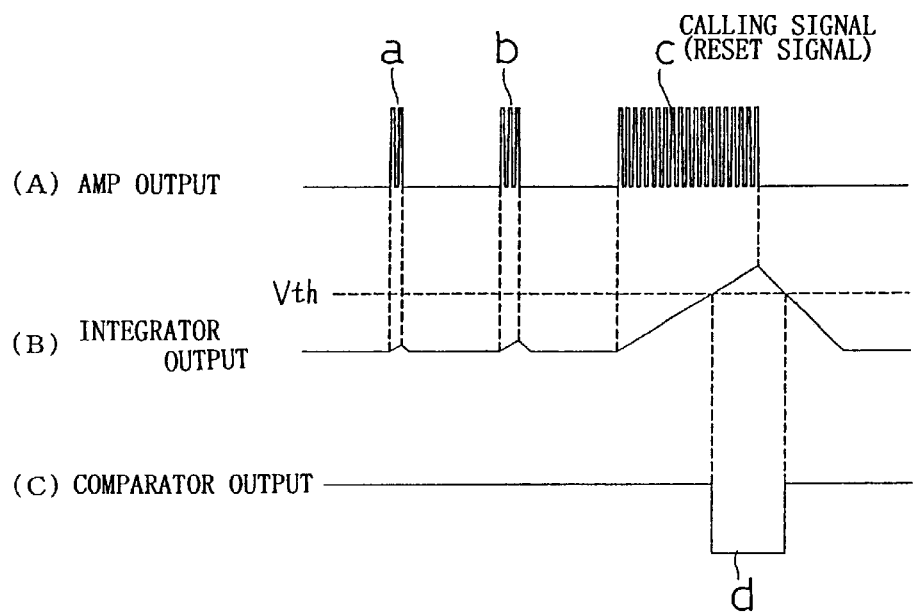
FIG. 17 is a graph showing the operation of the noise judgment section in the circuit.

FIG. 15 is a block diagram showing the main portion of the vehicle-side device 3, relating to the above-mentioned operation. FIG. 16 is a circuit diagram showing an actual circuit of the main portion. FIG. 17 is a graph showing the operation of the noise judgment section in the circuit.

Referring to FIG. 15, numeral 4 designates the transmission/reception device shown in FIG. 1, numeral 61 designates a reception device, numeral 62 designates the noise judgment section, and numeral 63 designates the signal processing section. These are formed of parts of the control section 41 and the transmission/reception section 42 shown in FIG. 1. Numeral 70 designates a battery mounted on the vehicle.

The signal processing section 63 comprises an amplifier 64 and a calculation section 65 that includes a CPU, a memory section comprising an EEPROM for example and other necessary circuits. The signal processing section 63 further comprises a constant voltage supply section 66, an amplifier 67, a first power control section 68, a second power control section 69, etc. The constant voltage of the constant voltage supply section 66 is always supplied to the reception device 61 and the noise judgment section 62, whereby these are activated. However, in the standby state, the CPU in the calculation section 65 is in a hold state wherein its power consumption is lower than that at the ordinary activation time. Furthermore, by the first power control section 68 and the second power control section 69, the amplifiers 64 and 67 are controlled so as to be set in their OFF states wherein no power is supplied.

When the transmission/reception device 4 receives a signal, the reception device 61 is turned ON. The output of the reception device 61 is sent to the noise judgment section 62 and the amplifier 64. When the noise judgment section 62 judges that the received signal is a calling signal, the judgment output signal thereof is input to the calculation section 65 via a judgment signal terminal 65a. Hence, the calculation section 65 is activated and becomes an ordinary operation state. The power control sections 68 and 69 are controlled by signals output from power control terminals 65b and 65c, and power is supplied to the amplifiers 64 and 67 to activate these circuits. The amplifier 64 has an amplifier circuit, a band-pass filter circuit, etc., and detects, amplifies and smoothens the output signal of the reception device 61. The output of the amplifier 64 is input from an operation signal input terminal 65d to the calculation section 65 via an interface 71 that was activated simultaneously.

The calculation section 65 makes a check as to whether the input operation signal coincides with a predetermined code (regular signal) or not. If the signal is a regular signal, a predetermined control signal is output from a signal output terminal 65e depending on the content of the signal. The control signal amplified by the amplifier 67 is output from a control signal output terminal 67a to a device to be operated, which is not shown. Hence, the device to be operated is controlled by the output control signal, and a predetermined operation, such as door locking or unlocking, is carried out. Numeral 72a designates a terminal to which the signals of sensors for detecting various states of the device to be operated, such as the locking, opening/closing and other states of the door, are input. The detection signals of these sensors are input to the calculation section 65 via an interface 72 that was activated simultaneously. The above-mentioned calculation processing is carried out in consideration of the information of these signals.

FIG. 16 is a circuit diagram showing an actual circuit of the noise judgment section 62 and portions related thereto. The reception device 61 is formed of a semiconductor switch, for example. The noise judgment section 62 comprises an AC amplifier circuit 62a, an integrator circuit 62b and a comparator 62c having the circuits shown in FIG. 16. The amplifier 64 is formed of an IC having a predetermined function. The calling signal is a pulse signal that includes pulses generating at constant intervals and has a duration time of 0.04 seconds, for example. The signal from the reception device 61 is amplified by the AC amplifier circuit 62a and integrated by the integrator circuit 62b. Hence, if the duration time of the received signal is short and its integrated value is less than the reference value of the comparator 62c, the output signal of the comparator 62c remains unchanged from the state obtained while the integrated value is less than the reference value. The signal is input from the judgment signal terminal 65a to the calculation section 65, and the standby state continues. On the other hand, when the duration time of the received signal is long and its integrated value reaches the reference value of the comparator 62c, an output signal indicating that the integrated value has reached the reference value is input to the calculation section 65 from the comparator 62c.

FIG. 17 is a graph showing the above-mentioned operation of the noise judgment section 62. Letter A designates the output signal of the AC amplifier circuit 62a, letter B designates the output signal of the integrator circuit 62b, and letter C designates the output signal of the comparator 62c. Furthermore, letter Vth designates the reference value of the comparator 62c. If the output signal A has a short duration time, such as those of the signals shown by "a" and "b" in FIG. 17, the output signal B of the integrator circuit 62b does not reach the reference value Vth. On the other hand, if the output signal A having a long duration time, such as that of the signal shown by "c," is input to the integrator circuit 62b, the output signal B of the integrator circuit 62b reaches the reference value Vth. The output signal of the comparator 62c in the period wherein the output signal B is not less than the reference value becomes an L level as indicated by "d," Hence, in the case when the duration time of the calling signal is set at 0.04 seconds as described above, the time constant of the integrator circuit 62b is determined so that the integrated value reaches the reference value Vth after a lapse of 0.03 seconds, for example. In this case, if the duration time is shorter than 0.03 seconds, it is judged that a received signal is not the calling signal but noise. As a result, the signal processing section 63 is prevented from being activated by noise, that is, a signal different from the calling signal.

What is claimed is:

1. A keyless entry system for a vehicle, wherein an electronic key is activated when said electronic key receives an activation signal transmitted from said vehicle, said electronic key transmits an encrypted signal to said vehicle after judging that said activation signal is a regular signal, and said keyless entry system carries out predetermined control for vehicle-mounted devices after judging that said ecrypted signal is a regular signal, said keyless entry system being characterized in that detection distance setting means for changing a detection distance within which said electronic key can receive said activation signal is provided on said vehicle and that by carrying out predetermined operations said keyless entry system enters an adjustment mode wherein said detection distance can be changed by said detection distance setting means; and wherein said predetermined operations are a predefined number or more times of brake pedal operations and a predetermined number or more times of outer handle operations within a predetermined time, and said keyless entry system enters said adjustment mode by carrying out said predetermined operations.

2. A keyless entry item for a vehicle in accordance with claim 1, wherein, in said adjustment mode, one of present different detection distances is selected sequentially each time the brake pedal is pressed, and by pressing and keeping said brake pedal in its pressed state for a predetermined time, the detection distance selected at that time is set as a new detection distance.

3. A keyless entry system for a vehicle in accordance with any one of claims 1 and 2, wherein a transmission/reception section for generating said activation signal is provided with voltage adjustment means, and said detection distance is changed by changing the output voltage of said voltage adjustment means.

4. A keyless entry system for a vehicle in accordance with claim 1, wherein said-keyless entry system has an outside transmission antenna for transmitting said activation signal outside said vehicle interior and an inside transmission antenna for transmitting said activation signal inside said vehicle interior, and said detection distance within which said activation signal transmitted from each antenna is detected can be set for each antenna.

5. A keyless entry system for a vehicle in accordance with claim 4, wherein said keyless entry system has at least two outside transmission antennas and at least two inside transmission antennas, and said detection distance can be set for each antenna.

6. A keyless entry system for a vehicle in accordance with claim 1, wherein, after said electronic key is activated, the alarm device of said electronic key is activated if a signal judged to be irregular is received continuously a predetermined number or more of times.

7. A keyless entry system for a vehicle in accordance with claim 6, wherein signals judged to be irregular are counted, said alarm device is activated when the count reaches a predetermined value, and said count is reset when a signal judged to be regular is received after the start of the counting.

8. A keyless entry system for a vehicle in accordance with claim 7, wherein a lapse of time after the start of the counting is measured and said lapse of time is reset when a predetermined time passes after the start of the counting.

9. A keyless entry system for a vehicle in accordance with claims 8, wherein, after said electronic key is activated and if said electronic key continuously receives a signal judged to be irregular a predetermined number or more of times, the activation of said electronic key is canceled and made impossible thereafter.

10. A keyless entry system for a vehicle in accordance with claim 9, provided with reset means for returning said electronic key to a state wherein the activation of said electronic key is made possible.

11. A keyless entry system for a vehicle in accordance with claim 1, provided with a noise judgment section for making a judgment, after said electronic key is activated, as to whether a received signal is a calling signal to be transmitted or not before a predetermined encrypted signal is transmitted, wherein said noise judgment section is always kept in its activated state, and when a signal received by said noise judgment section is judged as a calling signal, a signal processing section for processing said encrypted signal transmitted after said calling signal and outputting predetermined control signals is activated.

12. A keyless entry system for a vehicle in accordance with claim 11, wherein said noise judgment section judges that a received signal is not said calling signal if the duration of the received signal is shorter than a predetermined time.

* * * * *